United States Patent
Wang

(10) Patent No.: US 9,674,533 B2
(45) Date of Patent: Jun. 6, 2017

(54) PICTURE ALIGNMENTS IN MULTI-LAYER VIDEO CODING

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 353 days.

(21) Appl. No.: 14/243,513

(22) Filed: Apr. 2, 2014

(65) Prior Publication Data

US 2014/0301437 A1   Oct. 9, 2014

Related U.S. Application Data

(60) Provisional application No. 61/809,063, filed on Apr. 5, 2013.

(51) Int. Cl.

| H04N 11/02 | (2006.01) |
|---|---|
| H04N 19/107 | (2014.01) |
| H04N 19/70 | (2014.01) |
| H04N 19/30 | (2014.01) |
| H04N 19/169 | (2014.01) |
| H04N 19/31 | (2014.01) |

(52) U.S. Cl.
CPC ......... *H04N 19/107* (2014.11); *H04N 19/188* (2014.11); *H04N 19/30* (2014.11); *H04N 19/70* (2014.11); *H04N 19/31* (2014.11)

(58) Field of Classification Search
CPC .................................................. H04N 19/107
USPC ...................................... 375/240.01–240.29
See application file for complete search history.

(56) References Cited

U.S. PATENT DOCUMENTS

| 2006/0153463 | A1* | 7/2006 | Notoya | H04N 19/70 |
|---|---|---|---|---|
| | | | | 382/236 |
| 2009/0116558 | A1* | 5/2009 | Chen | H04N 19/597 |
| | | | | 375/240.16 |
| 2010/0232520 | A1 | 9/2010 | Wu et al. | |
| 2011/0081133 | A1 | 4/2011 | Chen et al. | |
| 2011/0134994 | A1 | 6/2011 | Lu et al. | |
| 2013/0272430 | A1 | 10/2013 | Sullivan et al. | |

(Continued)

FOREIGN PATENT DOCUMENTS

EP   2304955 A1   4/2011

OTHER PUBLICATIONS

Boyce et al., "Joint BoG report on extension high-level syntax", JCT-3V Meeting; MPEG Meeting; Jan. 17-23, 2013; Geneva; (The Joint Collaborative Team on 3D Video Coding Extension Development of ISO/IEC JTC11SC29/WG11 and ITU-T SG.16 ); URL:http://phenix.int-evry.fr/jct2/, No. JCT3V-C0235, XP030130651, 5 pp.

(Continued)

*Primary Examiner* — Leron Beck
(74) *Attorney, Agent, or Firm* — Shumaker & Sieffert, P.A.

(57) ABSTRACT

A video encoder generates an encoded video bitstream comprising a plurality of layers. At least one access unit of the encoded video bitstream includes one or more Instantaneous Decoding Refresh (IDR) pictures and one or more non-IDR pictures. The IDR pictures include only slices that are decoded using intra prediction only. The video encoder outputs the encoded video bitstream. A video decoder decodes the encoded video bitstream.

36 Claims, 6 Drawing Sheets

(56) References Cited

U.S. PATENT DOCUMENTS

| | | | |
|---|---|---|---|
| 2014/0050264 A1* | 2/2014 | He | H04N 19/70 |
| | | | 375/240.16 |
| 2014/0085415 A1* | 3/2014 | Bici | H04N 19/00769 |
| | | | 348/43 |
| 2014/0301453 A1 | 10/2014 | Deshpande | |
| 2014/0301485 A1 | 10/2014 | Ramasubramanian et al. | |
| 2014/0355692 A1 | 12/2014 | Ramasubramanian et al. | |
| 2014/1429382 | 12/2014 | Ramasubramanian et al. | |

OTHER PUBLICATIONS

Bross, et al., High Efficiency Video Coding (HEVC) text specification draft 10 (for FDIS & Last Call), JCTVC-L1003 v32 11, Joint Collaborative Team on Video Coding (JCT-VC) of ITU-T SG 16 WP 3 and ISO/IEC JTC 1/SC 29/WG 11 12th Meeting, vol. JCTVC-L1003 v32, revised Mar. 16, 2013, XP055140558, 325 pp.

Bross, et al., "High Efficiency Video Coding (HEVC) text Specification draft 10 (for FDIS & Consent)," JCT-VC Meeting; MPEG Meeting; Jan. 17-23, 2013; Geneva; (Joint Collaborative Team on Video Coding of ISO/IEC JTC1/SC29/WG11 and ITU-T SG.16); Retrieved from the Internet , No. JCTVC-L1003, XP030113948, 321 pp.

Chen, et al., "High efficiency video coding (HEVC) scalable extensions Draft 5", JCT-VC Meeting; Jan. 9-17, 2014; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-P1008-v4, XP030115882, 125 pp.

Chen et al., "SHVC Draft Text 1", JCT-VC Meeting; MPEG Meeting; Jan. 14-23, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-L1008, XP030113953, 33 pp.

Chen et al., "MV-HEVC/SHVC HLS: On restriction and indication of cross-layer IRAP picture distribution" , JCT-VC Meeting; Jul. 27-Aug. 2, 2013; Vienna; (Joint Collaborative Team on Video Coding of ISO/IEC JTC1/SC29/WG11 and ITU-T SG.16); URL: Hhtp://wftp3.itu.int/av-arch/jctvc-site/, No. JCTVC-N0147, XP030114616, 3 pp.

Choi et al., "AHG7: On Random access point pictures and picture order counts for MV-HEVC", JCT-3V Meeting; 103. MPEG Meeting; Jan. 17-23, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-C0081, XP030130497, 3 pp.

Choi, et al., "MV-HEVC/SHVC HLS: Random access of multiple layers", JCT-VC Meeting; Jul. 25-Aug. 2, 2013 Vienna, (Joint Collaborative Team on Video Coding of ISO/IEC JTC1/SC29/WG11 and ITU-T SG.16 ), URL : http://wftp3.itu.int/av-arch/jctvc-site/,, No. JCTVC-N0121-v4, XP030114579, 4 pp.

Hannuksela "MV-HEVC/SHVC HLS: Layer-wise startup of the decoding process", JCT-VC Meeting; MPEG Meeting; Apr. 18-26, 2013; Incheon; (Joint Collaborative Team on Video Coding of ISO/IEC JTC1/SC29/WG11 and ITU-T SG.16 ); URL: http://wftp3.itu.int/av-arch/jctvc-site/ No. JCTVC-M0206, XP030114163, 5 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Hannuksela "MV-HEVC/SHVC HLS: Layer-wise startup of the decoding process", JCT-3V Meeting; Jul. 27- Aug. 2, 2013; Vienna; (The Joint Collaborative Team on 3D Video Coding Extension Development of ISO/IEC JTC1/SC29/WG11 and ITU-T SG.16 ); URL: http://phenix.int-evry.fr/jct2/ No. JCT3V-E0052, XP030131052, 5 pp.

Hannuksela "MV-HEVC/SHVC HLS: on splicing and layer-wise start-up of the decoding", JCT-VC Meeting; Oct. 23-Nov. 1, 2013; Geneva; (Joint Collaborative Team on Video Coding of ISO/IEC JTC1/SC29/WG11 and ITU-T SG.16 ); URL: http://wftp3.itu.int/av-arch/jctvc-site/ No. JCTVC-O0149, XP030115167, 2 pp.

Ikai et al., "AHG7: RAP picture alignment and slice definition", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-C0085, XP030130501, 4 pp.

Merkle et al, "Efficient Prediction Structures for Multiview Video Coding", IEEE Trans on Circuits and Systems for Video Technology, vol. 17, No. 11, Nov. 2007, pp. 1461-1473.

Ramasubramanian et al., "MV-HEVC/SHVC HLS: On CL-RAS Pictures", JCT-VC Meeting; Oct. 23-Nov. 1, 2013; Geneva; (Joint Collaborative Team on Video Coding of ISO/IEC JTC1/SC29/WG11 and ITU-T SG.16); URL: http://WFTP3.ITU.INT/AV-ARCH/JCTVC-SITE/., No. JCTVC-O0212, XP030115260, 17 pp.

Ramasubramanian et al., "MV-HEVC/SHVC HLS: Cross-Layer Non-Alignment of IRAP Pictures", JCT-VC Meeting, Jul. 25-Aug. 2, 2013; Vienna, (Joint Collaborative Team on Video Coding of ISO/IEC JTC1/SC29/WG11 and ITU-T SG.16), URL: http://wftp3.itu.int/av-arch/jctvc-site/, No. JCTVC-N0090, XP030114536, 4 pp.

Rapaka et al., "MV-HEVC/SHVC HLS: On Signalling of random accessibility for IRAP pictures in non-IRAP AUs", JCT-3V Meeting; Oct. 23-Nov. 1, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-F0079, XP030131487, 3 pp.

Schwarz et al., "Overview of the Scalable Video Coding Extension of the H.264/AVC Standard", IEEE Transactions on Circuits and Systems for Video Technology, IEEE Service Center, Piscataway, NJ, US, vol. 17, No. 9, Sep. 2007, XP011193019, pp. 1103-1120.

Sjoberg, et al., "Overview of HEVC high-level syntax and reference picture management" IEEE Transactions on Circuits and Systems for Video Technology, Jan. 2012, XP055045360, 14 pp.

Tech et al: "MV-HEVC Draft Text 3", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/ No. JCT3V-C1004 d3, XP002727084, 34 pp.

Wang, et al., "AHG9: On cross-layer alignments in HEVC 3DV and scalable extensions," JCT-VC Meeting; MPEG Meeting; Apr. 18-26, 2013; Incheon; (Joint collaborative team on video coding of ISO/IEC JTC1/SC29/WG11 and ITU-T SG.16); Retrieved from the Internet No. JCTVC-M0266, XP030114223, 6 pp.

Wang, "AHG9: On CRA and BLA pictures", JCT-VC Meeting; MPEG Meeting; Oct. 10-19, 2012; Shanghai; (Joint Collaborative Team on Video Coding of ISO/IEC JTC1/SC29/WG11 and ITU-T SG.16 ); URL: http://wftp3.itu.int/av-arch/jctvc-site/,, No. JCTVC-K0122, XP030113004, 3 pp.

Wang, et al., "MV-HEVC/SHVC HLS: On various cross-layer alignments" , JCT-VC Meeting; Jul. 25-Aug. 2, 2013; Vienna; (Joint Collaborative Team on Video Coding of ISO/IEC JTC1/SC29/WG11 and ITU-T SG.16 ); URL: http://wftp3.itu.int/av-arch/jctvc-site/, No. JCTVC-N0084, XP030114530, 5 pp.

Wang et al: "Enhancement-layer IDR picture (EIDR)", JUT Meeting; MPEG Meeting; Oct. 14-21, 2005; Nice, FR;(Joint Video Team of ISO/IEC JTC1/SC29/WG11 and ITU-T SG.16 ) No. JVT-Q065, XP030006226, 7 pp.

Deshpande, et al., "AHG11: Signaling of CRA Pictures", JCT-VC Meeting; MPEG Meeting; Apr. 27-May 7, 2012; Geneva; (Joint Collaborative Team on Video Coding of ISO/IEC JTC1/SC29/WG11 and ITU-T SG.16); URL: http://wftp3.itu.int/av-arch/jctvc-site/., No. JCTVC-I0278, XP030112041, 4 pp.

Hannuksela, et al., "HEVC v1 Scalability Hook: Long-Tem Pictures with Layer Id Values", JCT-VC Meeting, 103. MPEG Meeting, Jan. 14-23, 2013, Geneva, (Joint Collaborative Team on Video Coding of ISO/IEC JTC1/SC29/WG11 and ITU-T SG.16), URL: http"//wftp3.itu.int/av-arch/jctvc-site/, No. JCTVC-L0170, XP030113658, 9 pp.

Wang et al., "AHG9: HEVC HRD Cleanups", JCT-VC Meeting; MPEG Meeting; Jan. 14-23, 2013; Geneva; (Joint Collaborative

(56) References Cited

OTHER PUBLICATIONS

Team on Video Coding of ISO/IEC JTC1/SC29/WG11 and ITU-T SG.16 ); URL: http://wftp3.itu.int/av-arch/jctvc-site/,, No. JCTVC-L0044, XP030113532, 4 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (For FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Tech, et al., "MV-HEVC Draft Text 4-JCT3V-D1004 v4", Joint Collaborative Team on 3D Video Coding Extension Development of ITU-T SG 16 WP 3 and ISO/IEC JTC 1/SC 29/WG 11 4th Meeting: Incheon, vol. JCT3V-D1004 v4, XP055141490, 62 pp.
Chen, et al., "SHVC Working Draft 2," Joint Collaborative Team on 3D Video Coding Extension Development of ITU-T SG 16 WP 3 and ISO/IEC JTC 1/SC 29/WG 11; Apr. 18-26, 2013, Document: JCTVC-M1008_v1, 53 pp.
Tech, et al., "MV-HEVC Draft Text 5", Joint Collaborative Team on 3D Video Coding Extension Development of ITU-T SG 16 WP 3 and ISO/IEC JTC 1/SC 29/WG 11, Doc: JCT3V-E1004-v6, 5th Meeting: Vienna, AT, Jul. 27-Aug. 2, 2013, 65 pp.
Bross et al., "Editors' proposed corrections to HEVC version 1 ," Joint Collaborative Team on Video Coding (JCT-VC) of ITU-T SG 16 WP 3 and ISO/IEC JTC 1/SC 29/WG 11, JCTVC-M0432_v3, Apr. 18-26, 2013, 310 pp.
McCann, et al., "HM6: High Efficiency Video Coding (HEVC) Test Model 6 Encoder Description," Joint Collaborative Team on Video Coding (JCT-VC) of ITU-T SG 16 WP 3 and ISO/IEC JTC 1/SC 29/WG 11, Document No. JCTVC-H1002, Feb. 1-10, 2012, 53 pp.
Invitation to Pay Additional Fees from International Application No. PCT/US2014/032791, dated Jul. 11, 2014, 11 pp.
International Search Report and Written Opinion from International Application No. PCT/US2014/032791, dated Sep. 26, 2014, 27 pp.
International Preliminary Report on Patentability from International Application No. PCT/US2014/032791, dated Oct. 15, 2015, 20 pp.
Wang, et al., "AHG9: On cross-layer alignments in HEVC 3DV and scalable extensions," Joint Collaborative Team on Video Coding (JCT-VC) of ITU-T SG 16 WP 3 and ISO/IEC JTC 1/SC 29/WG 11, Document: JCTVC-M0266_v2, Apr. 18-26, 2013, 6 pp.
Tech, et al., "MV-HEVC Draft Text 3 (ISO/IEC 23008-2:201x/PDAM2)," Joint Collaborative Team on Video Coding (JCT-VC) of ITU-T SG 16 WP 3 and ISO/IEC JTC 1/SC 29/WG 11, Document: JCT3V-C1004_d3, Jan. 17-23, 2013, 39 pp.
Tech, et al., "MV-HEVC Draft Text 4," MPEG Meeting; Apr. 20-26, 2013; (The Joint Collaborative Team on 3D Video Coding Extension Development of ISO/IEC JTC1/SC29/WG11 and ITU-T SG.16), Document: JCT3V-D1004_d0, Apr. 13, 2013, 53 pp.
Wang, et al., "AHG9: On cross-layer alignments in HEVC 3DV and scalable extensions," Joint Collaborative Team on Video Coding (JCT-VC) of ITU-T SG 16 WP 3 and ISO/IEC JCT 1/SC 29/WG 11, Apr. 18-26, 2013; 13th Meeting: Incheon, KR, JCTVC-M0266_v2, Apr. 21, 2013, 6 pp.

* cited by examiner

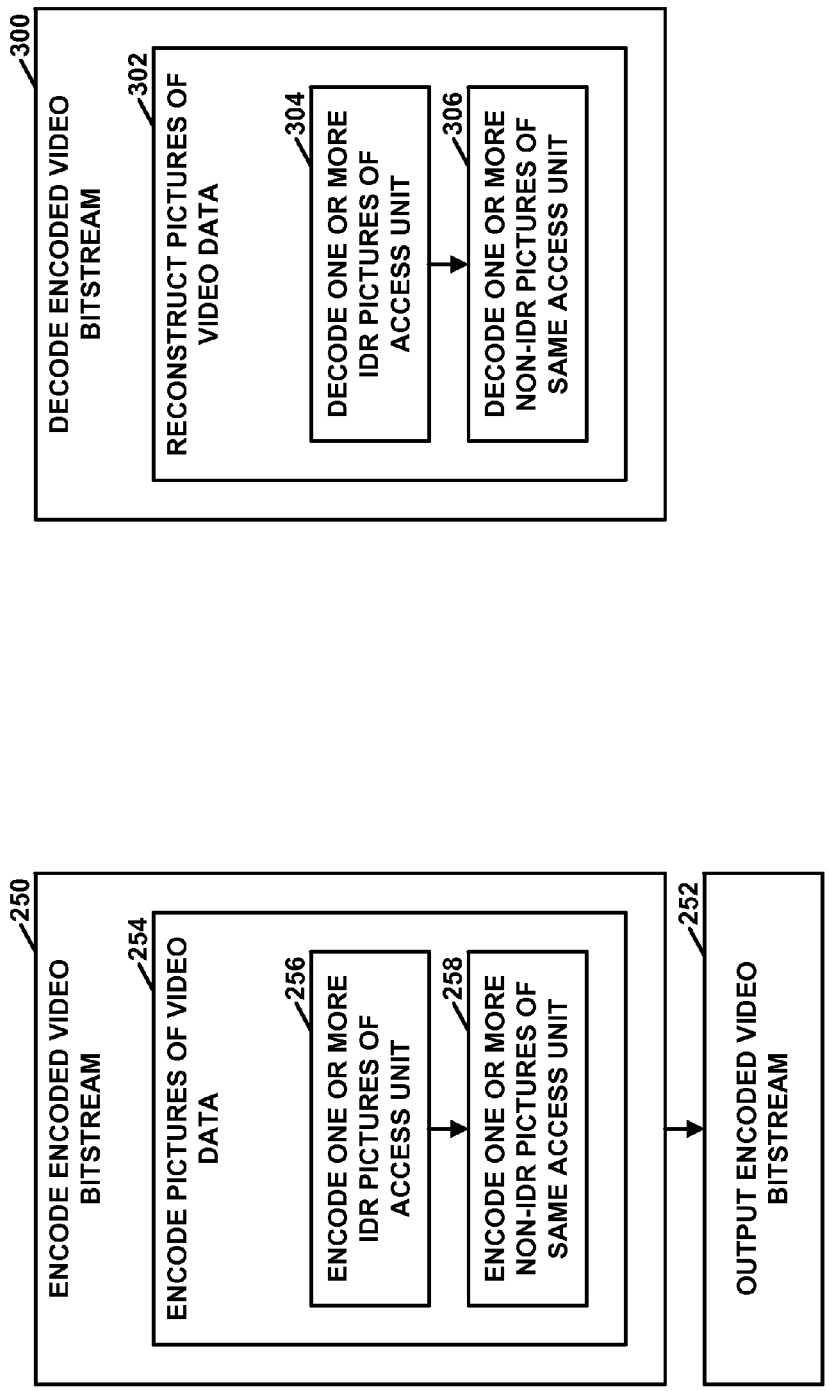

PICTURE ALIGNMENTS IN MULTI-LAYER VIDEO CODING

This application claims the benefit of U.S. Provisional Patent Application No. 61/809,063, filed Apr. 5, 2013, the entire content of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multiview coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

In general, this disclosure describes encoding and decoding of an encoded video bitstream comprising a plurality of layers. In accordance with at least some techniques of this disclosure, at least one access unit of the encoded video bitstream includes one or more Instantaneous Decoding Refresh (IDR) pictures and one or more non-IDR pictures. Thus, IDR pictures of the encoded video bitstream are not required to be cross-layer aligned.

In one example, this disclosure describes a method of decoding video data, the method comprising decoding an encoded video bitstream comprising a plurality of layers, wherein at least one access unit of the encoded video bitstream includes one or more IDR pictures and one or more non-IDR pictures, wherein decoding the encoded video bitstream comprises reconstructing pictures of the video data based at least in part on syntax elements decoded from the bitstream.

In another example, this disclosure describes a method of encoding video data, the method comprising: generating an encoded video bitstream comprising a plurality of layers, wherein at least one access unit of the encoded video bitstream includes one or more IDR pictures and one or more non-IDR pictures; and outputting the encoded video bitstream.

In another example, this disclosure describes a device for decoding video data, the device comprising: a memory configured to store video data; and one or more processors in communication with the memory and configured to decode an encoded video bitstream that comprises a plurality of layers, wherein at least one access unit of the encoded video bitstream includes one or more IDR pictures and one or more non-IDR pictures, wherein the one or more processors are configured such that, as part of decoding the encoded video bitstream, the one or more processors reconstruct pictures of the video data based at least in part on syntax elements decoded from the bitstream.

In another example, this disclosure describes a device for encoding video data, the device comprising: a memory configured to store video data; and one or more processors in communication with the memory and configured to: generate an encoded video bitstream comprising a plurality of layers, wherein at least one access unit of the encoded video bitstream includes one or more IDR pictures and one or more non-IDR pictures; and output the encoded video bitstream.

In another example, this disclosures describes a device for decoding video data, the device comprising: means for decoding an encoded video bitstream comprising a plurality of layers, wherein at least one access unit of the encoded video bitstream includes one or more IDR pictures and one or more non-IDR pictures, wherein the means for decoding the encoded video bitstream comprises means for reconstructing pictures of the video data based at least in part on syntax elements decoded from the bitstream.

In another example, this disclosure describes a device for encoding video data, the device comprising: means for generating an encoded video bitstream comprising a plurality of layers, wherein at least one access unit of the encoded video bitstream includes one or more IDR pictures and one or more non-IDR pictures; and means for outputting the encoded video bitstream.

In another example, this disclosure describes a non-transitory computer-readable data storage medium having instructions stored thereon that when executed cause one or more processors to: decode an encoded video bitstream comprising a plurality of layers, wherein at least one access unit of the encoded video bitstream includes one or more IDR pictures and one or more non-IDR pictures, wherein as part of decoding the encoded video bitstream, the one or more processors reconstruct pictures of the video data based at least in part on syntax elements decoded from the bitstream.

In another example, this disclosure describes a non-transitory computer-readable data storage medium having instructions stored thereon that when executed cause one or more processors to: generate an encoded video bitstream comprising a plurality of layers, wherein at least one access unit of the encoded video bitstream includes one or more IDR pictures and one or more non-IDR pictures; and output the encoded video bitstream.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 6A is a flowchart illustrating an example operation of a video encoder, in accordance with one or more techniques of this disclosure.

FIG. 6B is a flowchart illustrating an example operation of a video decoder, in accordance with one or more techniques of this disclosure.

DETAILED DESCRIPTION

Figure 1:
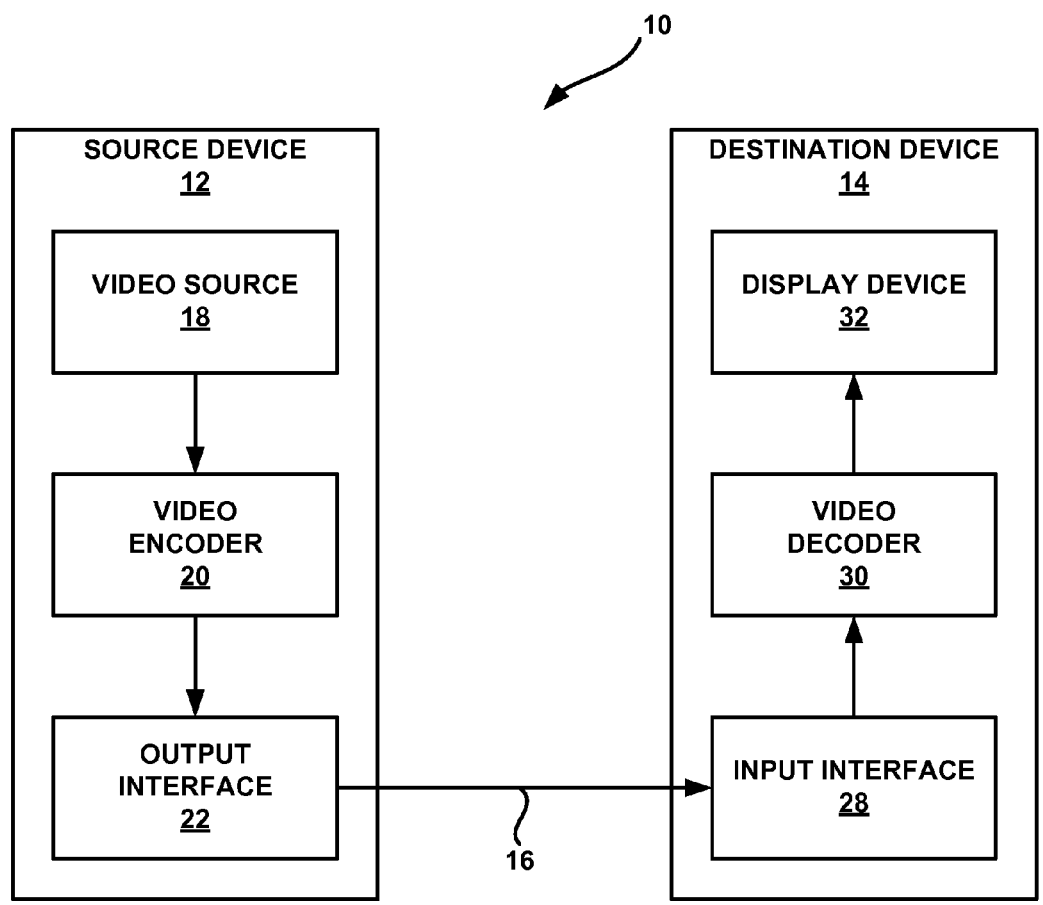
FIG. 1 is a block diagram illustrating an example video coding system that may utilize the techniques described in this disclosure.

High-Efficiency Video Coding (HEVC) is a newly-developed video coding standard. In HEVC, a bitstream may comprise a sequence of bits that forms a representation of coded pictures and associated data forming one or more coded video sequences (CVSs). There are currently ongoing efforts to develop multi-view video coding (i.e., MV-HEVC), 3-dimensional video coding (i.e., 3D-HEVC), and scalable video coding (SHVC) extensions to HEVC. In MV-HEVC, 3D-HEVC, and SHVC, coded pictures in a bitstream may be grouped into layers. In MV-HEVC and 3D-HEVC, the layers may correspond to different views. In SHVC, layers may include a base layer and enhancement layers that provide additional information to enhance the pictures of the base layer. Thus, in MV-HEVC, 3D-HEVC, and SHVC, the bitstream may include multiple coded pictures that correspond to the same time instance. Coded pictures in the same "access unit" may correspond to the same time instance. In general, a coded picture at a "lower" layer can be decoded without first decoding a picture at a relatively "higher" layer.

Furthermore, in HEVC, a CVS may include various types of pictures. For example, the first picture of a CVS may always be an Instantaneous Decoding Refresh (IDR) picture. An IDR picture may only include I slices (i.e., slices that are decoded using intra prediction only). Because IDR pictures only include I slices, decoding of IDR pictures does not depend on decoding of other pictures. Hence, video decoders may use IDR pictures as random access points into the bitstream (i.e., points at which the video decoders may start decoding the bitstream). However, IDR pictures provide significantly less compression than pictures that include slices that are decoded using inter prediction. Hence, while frequent inclusion of IDR pictures in a bitstream may increase the number of random access points, frequent inclusion of IDR pictures in the bitstream may increase the size of the bitstream.

HEVC and its extensions require IDR pictures to be cross-layer aligned. In other words, if an access unit includes an IDR picture, all pictures in the access unit must be IDR pictures. As described in this disclosure, there are several drawbacks to the requirements that IDR pictures be cross-layer aligned. For example, the requirement that IDR pictures be cross-layer aligned prevents a more efficient style of multi-layer coding. As indicated above, a video decoder does not need pictures of higher layers to decode pictures at lower layers. Hence, if it is acceptable that the video decoder does not decode all layers when the video decoder uses an IDR picture at a lower layer as a random access point, the video decoder may be able to start decoding higher layers later. Thus, if it is acceptable that the video decoder does not decode all layers when the video decoder uses an IDR picture at a lower layer as a random access point, the bitstream does not need to include IDR pictures at the higher layers. Not including IDR pictures at the higher layers may decrease the size of the bitstream.

Hence, in accordance with one or more techniques of this disclosure, IDR pictures are allowed to be cross-layer non-aligned. Thus, a video encoder may generate an encoded video bitstream comprising a plurality of layers. At least one access unit of the encoded video bitstream includes one or more IDR pictures and one or more non-IDR pictures. The IDR pictures include only slices that are decoded using intra prediction only. The video encoder outputs the encoded video bitstream. Similarly, a video decoder may decode an encoded video bitstream comprising a plurality of layers, wherein at least one access unit of the encoded video bitstream includes one or more IDR pictures and one or more non-IDR pictures.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information (e.g., to another device such as video decoder 30). The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. In some instances, any legal bitstream conforming to MVC-based 3DV always contains a sub-bitstream that is compliant to a MVC profile, e.g., stereo high profile. Furthermore, there is an ongoing effort to generate a three-dimensional video (3DV) coding extension to H.264/AVC, namely AVC-based 3DV. In other examples, video encoder 20 and video decoder 30 may operate according to ITU-T H.261, ISO/IEC MPEG-1 Visual, ITU-T H.262 or ISO/IEC MPEG-2 Visual, and ITU-T H.264, ISO/IEC Visual.

In other examples, video encoder 20 and video decoder 30 may operate according to the High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). A draft of the upcoming HEVC standard, referred to as "HEVC Working Draft 10" or "HEVC Working Draft 10, version 34" is described in Bross et al., "High Efficiency Video Coding (HEVC) text specification draft 10," Joint Collaborative Team on Video Coding (JCT-VC) of ITU-T SG16 WP3 and ISO/IEC JTC1/SC29/WG11, 12$^{th}$ Meeting, Geneva, Switzerland, January 2013, which as of Mar. 23, 2014, is available from http://phenix-.int-evey.fr/jct/doc_end_user/documents/10_Stockholm/wg11/JCTVC-L1003-v34.zip, the entire content of which is incorporated herein by reference. An earlier version of "HEVC Working Draft 10, version 1" is described in Bross et al., "High Efficiency Video Coding (HEVC) text specification draft 10," Joint Collaborative Team on Video Coding (JCT-VC) of ITU-T SG16 WP3 and ISO/IEC JTC1/SC29/WG11, 12$^{th}$ Meeting, Geneva, Switzerland, January 2013, which as of Mar. 23, 2014, is available from http://phenix.int-evey.fr/jct/doc_end_user/documents/10_Stockholm/wg11/JCTVC-L1003-v1.zip, the entire content of which is incorporated herein by reference.

Furthermore, there are ongoing efforts to produce SVC, MVC, and 3DV extensions for HEVC. The multi-view extension to HEVC, namely MV-HEVC, is also being developed by the JCT-3V. Tech et al., "MV-HEVC Draft Text 3 (ISO/IEC 23008-2:201x/PDAM2)," Joint Collaborative Team on Video Coding (JCT-VC) of ITU-T SG16 WP3 and ISO/IEC JTC1/SC29/WG11, 12$^{th}$ Meeting, Geneva, Switzerland, January 2013 (hereinafter referred to as "MV-HEVC WD 3"), the entire content of which is incorporated herein by reference, is a draft of MV-HEVC. As of Mar. 23, 2014, MV-HEVC WD3 is available from http://phenix.it-sudparis.eu/jct2/doc_end_user/documents/3_Geneva/wg11/JCT3V-C1004-v4.zip. The scalable extension to HEVC, named SHVC, is also being developed by the JCT-VC. Chen et al., "SHVC Draft Text 1," Joint Collaborative Team on Video Coding (JCT-VC) of ITU-T SG16 WP3 and ISO/IEC JTC1/SC29/WG11, 12$^{th}$ Meeting, Geneva, Switzerland, January 2013, (hereinafter referred to as "SHVC WD1"), the entire content of which is incorporated herein by reference, is a draft of SHVC. As of Mar. 23, 2014, SHVC WD1 is available from http://phenix.int-evry.fr/jct/doc_end_user/documents/12_Geneva/wg11/JCTVC-L1008-v1.zip.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector. When video encoder 20 uses bi-prediction to generate the predictive blocks for a PU, the PU may have two motion vectors.

After video encoder 20 generates predictive blocks (e.g., predictive luma, Cb and Cr blocks) for one or more PUs of a CU, video encoder 20 may generate a residual block for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may partition residual blocks into transform blocks. For instance, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a transform block of a TU to generate a luma coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element (e.g., nal_unit_type) that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Table 1, below, indicates NAL unit types, as defined in HEVC Working Draft 10.

TABLE 1

NAL unit type codes and NAL unit type classes

| nal_unit_type | Name of nal_unit_type | Content of NAL unit and RBSP syntax structure | NAL unit type class |
|---|---|---|---|
| 0 | TRAIL_N | Coded slice segment of a non-TSA, non-STSA trailing picture slice_segment_layer_rbsp( ) | VCL |
| 1 | TRAIL_R | | |
| 2 | TSA_N | Coded slice segment of a TSA picture slice_segment_layer_rbsp( ) | VCL |
| 3 | TSA_R | | |
| 4 | STSA_N | Coded slice segment of an STSA picture slice_segment_layer_rbsp( ) | VCL |
| 5 | STSA_R | | |
| 6 | RADL_N | Coded slice segment of a RADL picture slice_segment_layer_rbsp( ) | VCL |
| 7 | RADL_R | | |
| 8 | RASL_N | Coded slice segment of a RASL picture slice_segment_layer_rbsp( ) | VCL |
| 9 | RASL_R | | |
| 10 | RSV_VCL_N10 | Reserved non-IRAP sub-layer non-reference VCL NAL unit types | VCL |
| 12 | RSV_VCL_N12 | | |
| 14 | RSV_VCL_N14 | | |
| 11 | RSV_VCL_R11 | Reserved non-IRAP sub-layer reference VCL NAL unit types | VCL |
| 13 | RSV_VCL_R13 | | |
| 15 | RSV_VCL_R15 | | |
| 16 | BLA_W_LP | Coded slice segment of a BLA picture slice_segment_layer_rbsp( ) | VCL |
| 17 | BLA_W_RADL | | |
| 18 | BLA_N_LP | | |
| 19 | IDR_W_RADL | Coded slice segment of an IDR picture slice_segment_layer_rbsp( ) | VCL |
| 20 | IDR_N_LP | | |
| 21 | CRA_NUT | Coded slice segment of a CRA picture slice_segment_layer_rbsp( ) | VCL |
| 22 | RSV_IRAP_VCL22 | Reserved IRAP VCL NAL unit types | VCL |
| 23 | RSV_IRAP_VCL23 | | |
| 24 . . . 31 | RSV_VCL24 . . . RSV_VCL31 | Reserved non-IRAP VCL NAL unit types | VCL |
| 32 | VPS_NUT | Video parameter set video_parameter_set_rbsp( ) | non-VCL |
| 33 | SPS_NUT | Sequence parameter set seq_parameter_set_rbsp( ) | non-VCL |
| 34 | PPS_NUT | Picture parameter set pic_parameter_set_rbsp( ) | non-VCL |
| 35 | AUD_NUT | Access unit delimiter access_unit_delimiter_rbsp( ) | non-VCL |
| 36 | EOS_NUT | End of sequence end_of_seq_rbsp( ) | non-VCL |
| 37 | EOB_NUT | End of bitstream end_of_bitstream_rbsp( ) | non-VCL |
| 38 | FD_NUT | Filler data filler_data_rbsp( ) | non-VCL |
| 39 | PREFIX_SEI_NUT | Supplemental enhancement | non- |

TABLE 1-continued

NAL unit type codes and NAL unit type classes

| nal_unit_type | Name of nal_unit_type | Content of NAL unit and RBSP syntax structure | NAL unit type class |
|---|---|---|---|
| 40 | SUFFIX_SEI_NUT | information sei_rbsp( ) | VCL |
| 41 . . . 47 | RSV_NVCL41 . . . RSV_NVCL47 | Reserved | non-VCL |
| 48 . . . 63 | UNSPEC48 . . . UNSPEC63 | Unspecified | non-VCL |

In HEVC, SPSs may contain information that applies to all slices of a coded video sequence (CVS). In HEVC, a CVS may start from an instantaneous decoding refresh (IDR) picture, or a broken link access (BLA) picture, or a clean random access (CRA) picture that is the first picture in the bitstream, including all subsequent pictures that are not an IDR or BLA picture. That is, in HEVC, a CVS may comprise a sequence of access units that may consist, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit.

A VPS is a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. For conciseness, in this disclosure, the phrase "based on" may, in some instances, be interpreted as "based at least in part on." The process to reconstruct the video data may be generally reciprocal to the process performed by video encoder 20. For instance, video decoder 30 may use motion vectors of PUs to determine predictive sample blocks (i.e., predictive blocks) for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

As indicated above, a CVS may start from an IDR picture, or a BLA picture, or a CRA picture that is the first picture in the bitstream, including all subsequent pictures that are not IDR or BLA pictures. An IDR picture contains only I slices (i.e., slices in which only intra prediction is used). An IDR picture may be the first picture in the bitstream in decoding order, or may appear later in the bitstream. Each IDR picture is the first picture of a CVS in decoding order. In HEVC Working Draft 10, version 1, an IDR picture may be a random access picture (RAP) for which each slice segment has nal_unit_type equal to IDR_W_DLP or IDR_N_LP. In HEVC Working Draft 10, version 34, an IDR picture may be an intra random access point (IRAP) picture for which each VCL NAL unit has a nal_unit_type equal to IDR_W_RADL or IDR_N_LP.

IDR pictures may be used for random access. However, pictures following an IDR picture in decoding order cannot use pictures decoded prior to the IDR picture as reference. Accordingly, bitstreams relying on IDR pictures for random access can have significantly lower coding efficiency than bitstreams that use additional types of random access pictures. In at least some examples, an IDR access unit is an access unit that contains an IDR picture.

The concept of CRA pictures was introduced in HEVC to allow pictures that follow a CRA picture in decoding order, but precede the CRA picture in output order, to use pictures decoded before the CRA picture for reference. Pictures that follow a CRA picture in decoding order, but precede the CRA picture in output order, are referred to as leading pictures associated with the CRA picture (or leading pictures of the CRA picture). That is, to improve coding efficiency, the concept of CRA pictures was introduced in HEVC to allow pictures that follow a CRA picture in decoding order but precede the CRA picture in output order to use pictures decoded before the CRA picture for reference. A CRA access unit is an access unit in which the coded picture is a CRA picture. In HEVC Working Draft 10, version 1, a CRA picture is a random access picture for which each slice has nal_unit_type equal to CRA_NUT. In HEVC Working Draft 10, version 34, a CRA picture is an intra random access picture for which each VCL NAL unit has a nal_unit_type equal to CRA_NUT.

The leading pictures of a CRA picture are correctly decodable if the decoding starts from an IDR picture or a CRA picture occurring before the CRA picture in decoding order. However, the leading pictures of a CRA picture may be non-decodable when random access from the CRA picture occurs. Hence, a video decoder typically decodes the leading pictures of a CRA picture during random access decoding. To prevent error propagation from reference pictures that may not be available depending on where the decoding starts, no picture that follows a CRA picture both in decoding order and output order may use any picture that precedes the CRA picture either in decoding order or output order (which includes the leading pictures) for reference.

The concept of a BLA picture was introduced in HEVC after the introduction of CRA pictures and is based on the concept of CRA pictures. A BLA picture typically originates from bitstream splicing at the position of a CRA picture, and in the spliced bitstream, the splicing point CRA picture is changed to a BLA picture. Thus, BLA pictures may be CRA pictures at the original bitstreams and a CRA picture is changed to be a BLA picture by the bitstream splicer after bitstream splicing at the location of the CRA picture. In some instances, an access unit that contains a RAP picture may be referred to herein as a RAP access unit. A BLA access unit is an access unit that contains a BLA picture. In HEVC Working Draft 10, version 1, a BLA picture may be a RAP picture for which each slice segment has nal_unit_type equal to BLA_W_LP, BLA_W_DLP, or BLA_N_LP. In HEVC Working Draft 10, version 34, a BLA picture may be an intra random access picture for which each VCL NAL unit has nal_unit_type equal to BLA_W_LP, BLA_W_RADL, or BLA_N_LP.

In general, an IRAP picture contains only I slices, and may be a BLA picture, a CRA picture, or an IDR picture. For instance, HEVC Working Draft 10 indicates that an IRAP picture may be a coded picture for which each VCL NAL unit has nal_unit_type in the range of BLA_W_LP to RSV_IRAP_VCL23, inclusive. Furthermore, HEVC Working Draft 10 indicates that the first picture in the bitstream in decoding order must be an IRAP picture.

One difference between BLA pictures and CRA pictures is as follows. For a CRA picture, the associated leading pictures are correctly decodable if the decoding starts from a RAP picture before the CRA picture in decoding order. However, the leading pictures associated with a CRA picture may not be correctly decodable when random access from the CRA picture occurs (i.e., when decoding starts from the CRA picture, or in other words, when the CRA picture is the first picture in the bitstream). In contrast, there may be no scenario where the leading pictures associated with a BLA picture are decodable, even when decoding starts from a RAP picture before the BLA picture in decoding order.

Some of the leading pictures associated with a particular CRA picture or a particular BLA picture may be correctly decodable even when the particular CRA picture or the particular BLA picture is the first picture in a bitstream. These leading pictures may be referred to as decodable leading pictures (DLPs) or Random Access Decodable Leading (RADL) pictures. In HEVC Working Draft 10, a RADL picture may be a coded picture for which each VCL NAL unit has a nal_unit_type equal to RADL_R or RADL_N. Furthermore, HEVC Working Draft 10 indicates that all RADL pictures are leading pictures and that RADL pictures are not used as reference pictures for the decoding process of trailing pictures of the same associated IRAP picture. When present, all RADL pictures precede, in decoding order, all trailing pictures of the same associated IRAP picture. HEVC Working Draft 10 indicates that a RADL access unit may be an access unit in which the coded picture is a RADL picture. A trailing picture may be a picture that follows the associated IRAP picture (i.e., the previous IRAP picture in decoding order) in output order.

Other leading pictures may be referred to as non-decodable leading pictures (NLPs) or Random Access Skipped Leading (RASL) pictures. In HEVC Working Draft 10, a RASL picture may be a coded picture for which each VCL NAL unit has a nal_unit_type equal to RASL_R or RASL_N. All RASL pictures are leading pictures of an associated BLA or CRA picture.

Provided that necessary parameter sets are available when they need to be activated, an IRAP picture and all subsequent non-RASL pictures in decoding order can be correctly decoded without performing the decoding process of any pictures that precede the IRAP picture in decoding order. There may be pictures in a bitstream that contain only I slices that are not IRAP pictures.

IRAP pictures may have corresponding NoRaslOutputFlag variables. In HEVC Working Draft 10, if the current picture with a particular nuh_layer_id is an IDR picture, a BLA picture, the first picture with that particular nuh_layer_id in the bitstream in decoding order, or the first picture with that particular nuh_layer_id that follows an end of sequence NAL unit in decoding order, the variable NoRaslOutputFlag is set equal to 1. An end of sequence NAL unit is a NAL unit that indicates an end of a CVS. A nuh_layer_id may specify a layer identifier for a picture. In HEVC Working Draft 10, when an IRAP picture has a NoRaslOutputFlag equal to 1, the RASL pictures are not output and may not be correctly decodable because the RASL pictures may contain references to pictures that are not present in the bitstream. RASL pictures are not used as reference pictures for the decoding process of non-RASL pictures. When present, all RASL pictures precede, in decoding order, all trailing pictures of the same associated IRAP picture.

When the associated IRAP picture has a NoRaslOutputFlag equal to 1, the RASL picture is not output and may not be correctly decodable, as the RASL picture may contain references to pictures that are not present in the bitstream. RASL pictures are not used as reference pictures for the decoding process of non-RASL pictures. When present, all RASL pictures precede, in decoding order, all trailing pictures of the same associated IRAP picture. HEVC Working Draft 10 indicates that a RASL access unit is an access unit in which the coded picture is a RASL picture.

As specified in HEVC Working Draft 10, the following applies when the current picture is an IRAP picture. If the current picture is an IDR picture, a BLA picture, the first picture in the bitstream in decoding order, or the first picture that follows an end of sequence NAL unit in decoding order, the variable NoRaslOutputFlag is set equal to 1. Otherwise, if some external means not specified in HEVC Working Draft 10 is available to set the variable HandleCraAsBlaFlag to a value for the current picture, the variable HandleCraAsBlaFlag is set equal to the value provided by the external means and the variable NoRaslOutputFlag is set equal to HandleCraAsBlaFlag. Otherwise, the variable HandleCraAsBlaFlag is set equal to 0 and the variable NoRaslOutputFlag is set equal to 0.

In multi-view coding, there may be multiple views of the same scene from different viewpoints. The term "access unit" may be used to refer to the set of pictures that correspond to the same time instance. Thus, video data may be conceptualized as a series of access units occurring over time. A "view component" may be a coded representation of a view in a single access unit. In this disclosure, a "view" may refer to a sequence or set of view components associated with the same view identifier. A view component may contain a texture view component and a depth view component. In this disclosure, a "view" may refer to a set or sequence of one or more view components associated with the same view identifier.

A texture view component (i.e., a texture picture) may be a coded representation of the texture of a view in a single access unit. A texture view may be a sequence of texture view components associated with an identical value of view order index. A view order index of a view may indicate a camera position of the view relative to other views. A depth view component (i.e., a depth picture) may be a coded representation of the depth of a view in a single access unit. A depth view may be a set or sequence of one or more depth view components associated with an identical value of view order index.

Multi-view coding supports inter-view prediction. Inter-view prediction is similar to the inter prediction used in HEVC and may use the same syntax elements. However, when a video coder performs inter-view prediction on a current video block (such as a PU), video encoder 20 may use, as a reference picture, a picture that is in the same access unit as the current video block, but in a different view. In contrast, conventional inter prediction only uses pictures in different access units as reference pictures.

In multi-view coding, a bitstream may have a plurality of layers. Each of the layers may correspond to a different view. In multi-view coding, a view may be referred to as a "base view" if a video decoder (e.g., video decoder 30) can decode pictures in the view without reference to pictures in any other view. A view may be referred to as a "non-base view" or a "dependent view" if decoding of the view is dependent on decoding of pictures in one or more other views. When coding a picture in one of the non-base views, a video coder (such as video encoder 20 or video decoder 30) may add a picture into a reference picture list if the picture is in a different view but within a same time instance (i.e., access unit) as the picture that the video coder is currently coding. Like other inter prediction reference pictures, the video coder may insert an inter-view prediction reference picture at any position of a reference picture list.

In SVC, layers other than the base layer may be referred to as "enhancement layers" and may provide information that enhances the visual quality of video data decoded from the bitstream. SVC can enhance spatial resolution, signal-to-noise ratio (i.e., quality) or temporal rate. In scalable video coding (e.g., SHVC), a "layer representation" may be a coded representation of a spatial layer in a single access unit. For ease of explanation, this disclosure may refer to view components and/or layer representations as "view components/layer representations."

To implement the layers, headers of NAL units may include nuh_reserved_zero_6 bits syntax elements. NAL units that have nuh_reserved_zero_6 bit syntax elements that specify different values belong to different layers of a bitstream. Thus, in multi-view coding (e.g. MV-HEVC), 3DV (e.g. 3D-HEVC), or SVC (e.g., SHVC), the nuh_reserved_zero_6 bits syntax element of a NAL unit specifies a layer identifier (i.e., a layer ID) of the NAL unit. In some examples, the nuh_reserved_zero_6 bits syntax element of a NAL unit is equal to 0 if the NAL unit relates to a base layer in multi-view coding (e.g., MV-HEVC), 3DV coding (e.g. 3D-HEVC), or SVC (e.g., SHVC). Data in a base layer of a bitstream may be decoded without reference to data in any other layer of the bitstream. If the NAL unit does not relate to a base layer in multi-view coding, 3DV, or SVC, the nuh_reserved_zero_6 bits syntax element of the syntax element may have a non-zero value. As indicated above, in multi-view coding and 3DV coding, different layers of a bitstream may correspond to different views.

Furthermore, some view components/layer representations within a layer may be decoded without reference to other view components/layer representations within the same layer. Thus, NAL units encapsulating data of certain view components/layer representations of a layer may be removed from the bitstream without affecting the decodability of other view components/layer representations in the layer. Removing NAL units encapsulating data of such view components/layer representations may reduce the frame rate of the bitstream. A subset of view components/layer representations within a layer that may be decoded without reference to other view components/layer representations within the layer may be referred to herein as a "sub-layer" or a "temporal sub-layer."

NAL units may include temporal_id syntax elements that specify temporal identifiers (i.e., TemporalIds) of the NAL units. The temporal identifier of a NAL unit identifies a sub-layer to which the NAL unit belongs. Thus, each sub-layer of a bitstream may have a different temporal identifier. In general, if the temporal identifier of a first NAL unit is less than the temporal identifier of a second NAL unit, the data encapsulated by the first NAL unit may be decoded without reference to the data encapsulated by the second NAL unit.

A bitstream may be associated with a plurality of operation points. Each operation point of a bitstream is associated with a set of layer identifiers (e.g., a set of nuh_reserved_zero_6 bits values) and a temporal identifier. The set of layer identifiers may be denoted as OpLayerIdSet and the temporal identifier may be denoted as TemporalID. If a NAL unit's layer identifier is in an operation point's set of layer identifiers and the NAL unit's temporal identifier is less than or equal to the operation point's temporal identifier, the NAL unit is associated with the operation point. An operation point representation is a bitstream subset that is associated with an operation point. The operation point representation may include each NAL unit that is associated with the operation point. In some examples, the operation point representation does not include VCL NAL units that are not associated with the operation point.

A video processor (e.g., a media aware network element (MANE), splicing engine, video decoder, or other device) may apply bitstream thinning to an HEVC bitstream that is encoded with multiple sub-layers. At any point in the bitstream, a video processor can start removing or stop decoding NAL units of higher sub-layers (i.e., sub-layers associated with higher temporal identifiers) based on the fact that the pictures in the lower sub-layers (i.e., sub-layers associated with lower temporal identifiers) are still decodable because the decoding process for the pictures in the lower sub-layers does not depend on the NAL units of the higher sub-layers. The action of removing or stopping decoding of all NAL units with temporal identifiers higher than a certain value can be referred to as temporal down-switching. Temporal down-switching may always be possible.

The term "temporal up-switching" may refer to the action of starting to forward or starting to decode NAL units of a certain sub-layer that has not been forwarded or decoded up until that point. Temporal up-switching may only be possible if none of the pictures in the layer that is switched to depend on any picture in the same sub-layer prior to the point in the bitstream at which the switch was performed. Thus, the term "temporal sub-layer switching point" may refer to a picture that has no dependency on any other picture that is in the same sub-layer as the picture and that precedes the picture in decoding order.

In HEVC Working Draft 10, a SPS may include a sps_temporal_id_nesting_flag syntax element. When the sps_temporal_id_nesting_flag syntax element has a value equal to 1, all pictures with temporal identifiers greater than 0 are sub-layer switching points. Furthermore, in HEVC Working Draft 10, there may be two picture types associated with sub-layer switching points, namely the temporal sub-layer access (TSA) picture type and the step-wise temporal sub-layer access (STSA) picture type. The TSA and STSA picture types can be used to indicate temporal sub-layer switching points.

A TSA picture and pictures following the TSA picture in decoding order do not use pictures with TemporalIds equal to or greater than that of the TSA picture for inter prediction reference. A TSA picture enables up-switching, at the TSA picture, to the sub-layer containing the TSA picture or any higher sub-layer, from the immediately lower sub-layer. In some examples, all TSA pictures have temporal identifiers greater than 0. In HEVC Working Draft 10, a TSA picture is a coded picture for which each VCL NAL unit has nal_unit_type equal to TSA_R or TSA_N.

An STSA picture does not use pictures with the same TemporalId as the STSA picture for inter prediction reference. Pictures following an STSA picture in decoding order with the same temporal identifier as the STSA picture do not use pictures prior to the STSA picture in decoding order with the same temporal identifier as the STSA picture for inter prediction reference. In HEVC Working Draft 10, a STSA picture may be a coded picture for which each VCL NAL unit has nal_unit_type equal to STSA_R or STSA_N.

An STSA picture enables up-switching, at the STSA picture, to the sub-layer containing the STSA picture, from the immediately lower sub-layer. In some examples, all STSA pictures have temporal identifiers greater than 0. Thus, in contrast to a TSA picture, an STSA picture does not necessarily enable up-switching to any higher sub-layer. Rather, an STSA picture may only enable up-switching to the sub-layer containing the STSA picture.

There may be several problems in the video coding schemes described in SHVC WD1 and MV-HEVC WD3. For instance, the following problem and descriptions are based on SHVC WD1 and MV-HEVC WD3, with additional assumptions of the concepts of picture and access unit:

(coded) picture: Similar as the current (coded) picture definition, where a coded picture is equivalent to a layer representation in SVC and a view component in MVC.

access unit (AU): Similar as in SVC and MVC, an AU consists of all the coded pictures associated with the same output time and their associated non-VCL NAL units.

Existing solutions based on SHVC WD1 and MV-HEVC WD3 with the above concepts of picture and access unit are associated with several potential shortcomings or problems. For example, IDR pictures are required to be cross-layer aligned. This requirement would disallow more efficient multi-layer coding with either more random access points (RAPs) at lower layers for low-delay random accessing or more RAPs at higher layers for low-delay layer switching based on IDR pictures. One may argue that CRA pictures can be used in such scenarios for the random access functionality. However, CRA pictures may be associated with RASL pictures and are designed for use with highly-efficient but high-delay random access functionality. Using CRA NAL unit types for actual IDR pictures is telling wrong information to application systems and may cause confusion and even unexpected degraded systems behaviors that actually make good use of the correct IRAP NAL unit types. Furthermore, in some HEVC versions, CRA or BLA pictures cannot be applied simultaneously with the sub-picture-level hypothetical reference decoder (HRD) operations for ultralow delay.

In another example potential shortcoming or problem, IRAP pictures within one AU may have different NAL unit types (e.g., different values of nal_unit_type). For example, a layer-zero picture is an IDR picture and the layer-one picture in the same AU is a CRA picture. However, such flexibility increases costs for decoder conformance tests but may bring no benefit at all.

In another example potential shortcoming or problem, non-cross-layer alignments of RASL pictures or RADL pictures would break cross-layer leading picture discardability, i.e., causing RASL or RADL pictures to be discardable in multi-layer contexts. In another example, non-cross-layer alignments of TSA or STSA pictures may break cross-layer temporal sub-layer up switching capability. In another example, the concepts of IRAP, AU, and CVS are not clearly defined. For instance, the definition of a CVS provided in SHVC WD1 and MV-HEVC WD3 does not specify what kind of AU can be the first AU in a conforming bitstream. Thus, VPS and SPS activation is unclear. As part of this issue, the variable NoRaslOutputFlag is specified in the multi-layer context.

In general, this disclosure describes techniques for functional and simplified multi-layer video coding wherein cross-layer alignment of various types of pictures are required. In accordance with the techniques of this disclosure, IDR pictures may be allowed to be non-cross-layer aligned, NAL unit types of IRAP pictures within one AU may be required to be the same, RASL pictures and RADL pictures may be required to be cross-layer aligned, TSA and STSA pictures may be required to be cross-layer aligned, and the concepts of IRAP AU and CVS may be clearly specified.

With regard to cross-layer alignment of IRAP pictures, in SHVC WD1 and MV-HEVC WD3, CRA pictures are not required to be cross-layer aligned, while IDR pictures and BLA pictures are required to be cross-layer aligned. For instance, when one picture in an AU is an IDR picture, all pictures in the AU shall be IDR pictures. Furthermore, when one picture in an AU is a BLA picture, all pictures in the AU shall be BLA pictures.

Not requiring CRA pictures to be cross-layer aligned may allow for the following two advantageous usage scenarios. First, not requiring CRA pictures to be cross-layer aligned may allow for more frequent random access points (RAPs) at lower layers than at higher layers. For example, there may be twice as many RAPs at the base layer than at the enhancement layer in a two-layer setup. This may enable tuning-in to a broadcast or multicast session with low delay and high efficiency, as the receiver may tune-in to receive only the base layer first at an AU for which the base layer is a CRA picture while the enhancement layer is not and then add the enhancement layer at a position where both layers are CRA pictures. Second, not requiring CRA pictures to be cross-layer aligned may allow for more frequent RAPs at higher layers than at lower layers. For example, there may be twice as many RAPs at the enhancement layer than at the base layer in a two-layer setup. This would enable faster layer switching up with high efficiency. Note that with multi-loop decoding, which is the current assumption for both 3DV and scalable extensions, layer switching down is possible at any AU.

Requiring cross-layer alignment for IDR pictures would disallow the above advantageous usage scenarios when CRA or BLA pictures cannot be used while the random access functionality is still needed, e.g. in low-delay or even ultralow delay multi-party video conferencing. Potentially, CRA pictures can be used in such scenarios for the random access functionality. However, CRA pictures may be associated with RASL pictures and are designed for use with highly-efficient but high-delay random access functionality. Using CRA NAL unit types for actual IDR pictures is telling wrong information to applications systems and would cause confusion and even unexpected degraded systems behaviors that actually make good use of the correct IRAP NAL unit types. Furthermore, in some HEVC versions, CRA or BLA pictures cannot be applied simultaneously with the sub-picture-level HRD operations for ultralow delay.

The situation is different for BLA pictures. BLA pictures were CRA pictures at the original bitstreams and a CRA picture is changed to be a BLA picture by a bitstream splicer after bitstream splicing at the location of the CRA picture. Note that bitstream switching (not layer switching) can be considered as one way of bitstream splicing. Non-cross-layer-aligned BLA pictures do not enable the above advantageous usage scenarios as those were enabled by non-cross-layer-aligned CRA pictures. What non-cross-layer-aligned BLA pictures really enable is simple bitstream splicing operations at AUs with non-cross-layer-aligned CRA or BLA pictures.

For simplicity for the analysis, it may be assumed that there are only two layers and there is an AU wherein the base layer picture is a BLA picture and the enhancement layer picture is a trailing picture. Since the enhancement layer pictures from earlier AUs in decoding order were from a different bitstream, the enhancement layer pictures starting from the trailing picture cannot be correctly decoded until the next IRAP picture. Thus, a process would be needed in the standard specification to handle the enhancement layer pictures starting from that trailing picture, including generation of unavailable reference pictures, setting the picture output flag equal to 0, and so on. Moreover, as a new VPS and a new SPS would need to be activated at such an AU, the definition of CVS would need to be changed to allow such an AU to start a new CVS.

However, the benefit seems not convincing enough to cope with the above complications. For bitstream splicing in video editing, enabling bitstream splicing at cross-layer-aligned IRAP pictures (IDR, CRA, or BLA) may be good enough. For bitstream switching, applications can do such optimizations without requiring the spliced bitstream to be conforming.

Therefore, at least some of the techniques of this disclosure further allow IDR pictures to be cross-layer non-aligned, thus cross-layer alignment may only be required for BLA pictures, not for IDR and CRA pictures. Thus, in some examples, video encoder 20 may generate an encoded video bitstream comprising a plurality of layers, wherein at least one access unit of the encoded video bitstream includes one or more IDR pictures and one or more non-IDR pictures. Furthermore, video encoder 20 may output the encoded video bitstream. Similarly, video decoder 30 may decode an encoded video bitstream comprising a plurality of layers, wherein at least one access unit of the encoded video bitstream includes one or more IDR pictures and one or more non-IDR pictures. Furthermore, in some such examples, the encoded video bitstream conforms to a requirement that, for each respective access unit of the encoded video bitstream, if one picture of the respective access unit is a BLA picture, all pictures of the respective access unit are BLA pictures. In some examples, at least one access unit of the encoded video bitstream includes one or more CRA pictures and one or more non-CRA pictures.

With regard to cross-layer alignment of IRAP picture types, IRAP pictures within one AU may have different NAL unit types (e.g., different values of nal_unit_type). For example, a layer-zero picture may be an IDR picture and the layer-one picture in the same AU may be a CRA picture. However, such flexibility may increase costs for decoder conformance tests but brings no benefit at all. Accordingly, the techniques of this disclosure may require all IRAP pictures in an AU (regardless of whether some pictures in the AU are non-IRAP pictures) to have the same NAL unit type, as follows. If one picture in an AU has nal_unit_type nutA equal to a value in the range of BLA_W_LP . . . RSV_IRAP_VCL23, any other picture in the same access unit shall not have nal_unit_type that is in the range of BLA_W_LP . . . RSV_IRAP_VCL23 and not equal to nutA.

Thus, in this example, the encoded video bitstream conforms to a requirement that, for each respective AU of the encoded video bitstream, all IRAP pictures of the respective AU have the same NAL unit type. Furthermore, the encoded video bitstream may conform to a requirement that, for each respective AU of the encoded video bitstream, when a particular picture in the respective AU has a NAL unit type (e.g., nal_unit_type) equal to a value in a range from BLA_W_LP . . . RSV_IRAP_VCL23, any other picture in the respective access unit does not have a NAL unit type (e.g., nal_unit_type) that is in the range from BLA_W_LP . . . RSV_IRAP_VCL23 and not equal to the NAL unit type (e.g., nal_unit_type) of the particular picture.

With regard to cross-layer alignment of leading pictures, each leading picture (either RASL picture or RADL picture) may be associated with an IRAP picture. All leading pictures are discardable without affecting the decoding of trailing pictures, and RASL pictures must be discarded when random accessing from the associated IRAP picture. For leading picture discardability to be valid across layers, this disclosure proposes that each type of leading pictures for all IRAP pictures in the same AU are required to be cross-layer-aligned, as follows. When the pictures (picA and picB) of any two layers (layerA and layerB) in an AU are both IRAP pictures, their leading pictures shall be aligned as follows:

When there exists a picture picC in layerA that is a RASL picture of picA and there exists a picD that is in layerB and in the same AU as picC, picD shall be a RASL picture of picB.

When there exists a picture picE in layerA that is a RADL picture of picA and there exists a picF that is in layerB and in the same AU as picE, picF shall be a RADL picture of picB.

Thus, in the example of the previous paragraph, the encoded video bitstream may conform to a first requirement and a second requirement. The first requirement provides that, for each respective AU of the encoded video bitstream, when a first picture and a second picture of the respective AU are both IRAP pictures, where the first picture is of a first layer of the encoded video bitstream and the second picture is of a second layer of the encoded video bitstream and the first layer and the second layer are any two layers of the encoded video bitstream, and there exists a third picture in the first layer that is a RASL picture of the first picture and there exists a fourth picture that is in the second layer and in the same AU as the third picture, the fourth picture is a RASL picture of the second picture. The second requirement provides that when a fifth picture in the first layer is a RADL picture of the first picture and there exists a sixth picture that is in the second layer and the sixth picture is in the same AU as the fifth picture, the sixth picture is a RADL picture of the second picture. In this example (and at least some other examples of this disclosure), the ordinal identifiers of pictures (e.g., the "first" picture, "second" picture, etc.) do not necessarily imply that the pictures are at particular locations in an ordering of the pictures (e.g., output ordering or decoding ordering). Rather, the ordinal identifiers may merely serve as labels for different pictures.

As discussed above, TSA and STSA pictures enable temporal sub-layer up switching. Similarly, as discussed above for leading picture discardability to be valid across layers, here for temporal sub-layer up switching capability to be valid across layers, one or more example techniques of this disclosure require cross-layer alignment of TSA and STSA pictures, as follows:

When one picture in an access unit has nal_unit_type equal to TSA_N or TSA_R, any other picture in the same access unit shall have nal_unit_type equal to equal to TSA_N or TSA_R.

When one picture in an access unit has nal_unit_type equal to STSA_N or STSA_R, any other picture in the same access unit shall have nal_unit_type equal to STSA_N or STSA_R.

Thus, in this example, for each respective access unit of the bitstream, a first requirement and a second requirement are satisfied. The first requirement provides that when any picture in the respective AU is a TSA picture, each other picture in the respective AU is a TSA picture. The second requirement provides that when any picture in the respective AU is a STSA picture, each other picture in the respective AU is a STSA picture. Moreover, in some examples, the first requirement provides that when any picture in the respective AU has a nal_unit_type equal to TSA_N or TSA_R, each other picture in the respective AU has a nal_unit_type equal to TSA_N or TSA_R, and the second requirement provides that when any picture of the respective AU has nal_unit_type equal to STSA_N or STSA_R, each other picture in the respective AU has a nal_unit_type equal to STSA_N or STSA_R.

Alternatively, the NAL unit types may be more tightly restricted as follows. When one picture in an access unit has nal_unit_type nutA equal to TSA_N, TSA_R, STSA_N, or STSA_R, any other picture in the same access unit shall have nal_unit_type equal to nutA. However, the tighter constraint may disallow efficient use of sub-layer non-reference pictures at lower layers when higher layers have higher picture rates.

Thus, in this example, for each respective AU of the bitstream, a requirement is satisfied. The requirement provides that, for each respective picture of the respective AU, if a NAL unit type of the respective picture is a TSA picture or a STSA picture, each other picture of the respective AU has the same NAL unit type as the respective picture. For instance, the requirement may provide that, for each respective picture of the respective AU, when the respective picture has nal_unit_type equal to TSA_N, TSA_R, STSA_N, or STSA_R, any other picture in the respective access unit shall have nal_unit_type equal to the nal_unit_type of the respective picture.

In accordance with one or more example techniques of this disclosure, the terms "IRAP access unit" and "CVS" may be defined as follows:

IRAP access unit: An access unit in which all the coded pictures are IRAP pictures. It is required that the first AU in a CVS is an IRAP AU.

coded video sequence (CVS): A sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. It is required that the first AU in a bitstream is a start of a CVS.

The above definition of IRAP AU may simplify the definition of CVS, which basically determines the parameter sets activation process, as well as the bitstream conformance specification. The parameter sets activation process determines, among other things, where the spatial resolution of a layer can change. One simple aspect in bitstream conformance is what kind of AU can be the first AU in a conforming bitstream. One complication in bitstream conformance is that sub-bitstreams themselves are (recursively) required to be conforming.

Hence, in accordance with one example technique of this disclosure, an encoded video bitstream includes one or more CVSs. Each CVS of the encoded video bitstream is a sequence of access units that consists, in decoding order, of an IRAP access unit with a RASL output variable (e.g., NoRaslOutputFlag) indicating a particular value (e.g., 1), followed by zero or more access units that are not IRAP access units with RASL output variables indicating the particular value, including all subsequent access units up to but not including any subsequent access unit that is an IRAP access unit with a RASL output variable indicating the particular value. In this example, it may be required that the first access unit in the encoded video bitstream is a start of a CVS. Furthermore, in this example, an IRAP access unit is an access unit in which all coded pictures are IRAP pictures. In this example, the first access unit in a CVS is required to be an IRAP access unit. In this example, the RASL output variable of the IRAP picture has the particular value when the IRAP picture is an IDR picture, a BLA picture, the first picture in the bitstream in decoding order, or the first picture that follows an end of sequence NAL unit in decoding order.

However, several complications are allowed by these definitions of IRAP AU and CVS. First, an AU in a particular bitstream may be an IRAP AU for decoders conforming to one profile but not another. For example, when an AU of a multi-layer bitstream has a base layer picture that is an IRAP picture but at least one non-base layer picture is a non-IRAP picture, then the AU is an IRAP AU to Main profile decoders but a non-IRAP AU to the "Main Scalable" or "Main Multiview" profiles. In general, a "profile" is a subset of the entire bitstream syntax.

Second, an AU in one bitstream subset of a particular bitstream may be an IRAP AU but in another bitstream subset it may be an non-IRAP AU as seen by the same decoder. For example, when in an AU, the base layer picture is an IRAP, the layer 1 picture is also an IRAP, but the layer 2 picture is a non-IRAP. In this case, to a "Main Scalable" or "Main Multiview" profile decoder, the AU is an IRAP AU in a sub-bitstream consisting of only layers 0 and 1, while the AU is a non-IRAP AU in a sub-bitstream consisting of layers 0, 1, and 2.

One phenomenon (not necessarily a problem) associated with these definitions of IRAP AU and CVS is that if the first AU in a bitstream is required to be an IRAP AU, then with the above 3-layer example, if the AU discussed above is the first AU in the sub-bitstreams, then the sub-bitstream with 3 layers cannot be a conforming bitstream, while when layer 3 is removed, it may become a conforming bitstream.

In some instances, for the above definition of CVS to work, NoRaslOutputFlag is specified to be defined for each IRAP AU, and the value is set equal to 1 if all the pictures in the IRAP AU have NoRaslOutputFlag equal to 0 and is set equal to 0 otherwise. NoRaslOutputFlag is not defined for non-IRAP AUs.

Figure 2:
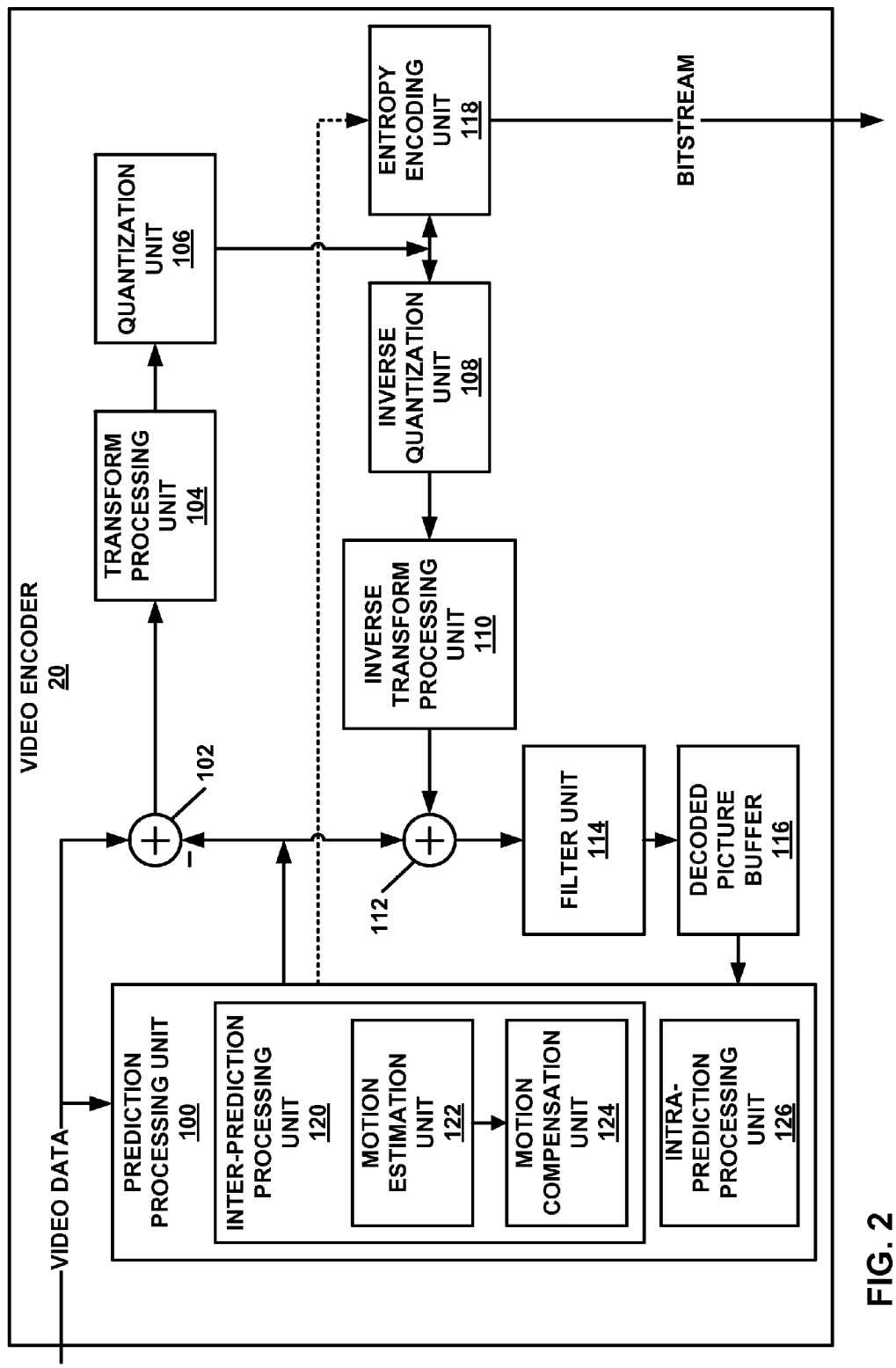
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include a predictive blocks of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predictive block is formed using spatial prediction from previously-encoded neighboring blocks within the same picture.

If a PU is in a P slice, motion estimation unit 122 may search the reference pictures in a list of reference pictures (e.g., "RefPicList0") for a reference region for the PU. The reference region for the PU may be a region, within a reference picture, that contains sample blocks that most closely correspond to the sample blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a coding block of the PU and a reference location associated with the reference region. For instance, the motion vector may be a two-dimensional vector that provides an offset from the coordinates in the current decoded picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a sample block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference region indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference location associated with the reference regions and a sample block of the PU. The motion information of the PU may include the reference indexes and the motion vectors of the PU. Motion compensation unit 124 may generate the predictive blocks of the PU based at least in part on actual or interpolated samples at the reference region indicated by the motion vector of the PU.

In some examples, inter-prediction processing unit 120 does not generate syntax elements that explicitly specify the motion vectors and/or other motion information of PUs. For instance, in HEVC and other video coding standards or specifications, inter-prediction processing unit 120 may use merge mode or advanced motion vector prediction (AMVP) to signal the motion vectors and/or other motion information of PUs.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. In different intra prediction modes, intra-prediction processing unit 126 uses samples from sample blocks of neighboring PUs in different ways to generate predictive blocks for the PUs. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on coding blocks (e.g., the luma, Cb and Cr coding block) of a CU and the selected predictive blocks (e.g., luma, Cb and Cr predictive blocks) of the PUs of the residual blocks (e.g., luma, Cb and Cr residual blocks) of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, quantization unit 106 may round an n-bit transform coefficient down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Thus, decoded picture buffer 116 may be a memory that stores video data. Inter-prediction unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data.

Video encoder 20 may output a bitstream that includes entropy-encoded data generated by entropy encoding unit 118. For instance, the bitstream may include data that represents a RQT for a CU. In accordance with one or more techniques of this disclosure, video encoder 20 of FIG. 2 may generate the bitstream such that the bitstream comprises a plurality of layers. At least one access unit of the encoded video bitstream includes one or more IDR pictures and one or more non-IDR pictures. For instance, video encoder 20 may encode an IDR picture of an access unit and a non-IDR picture of the same access unit.

Figure 3:
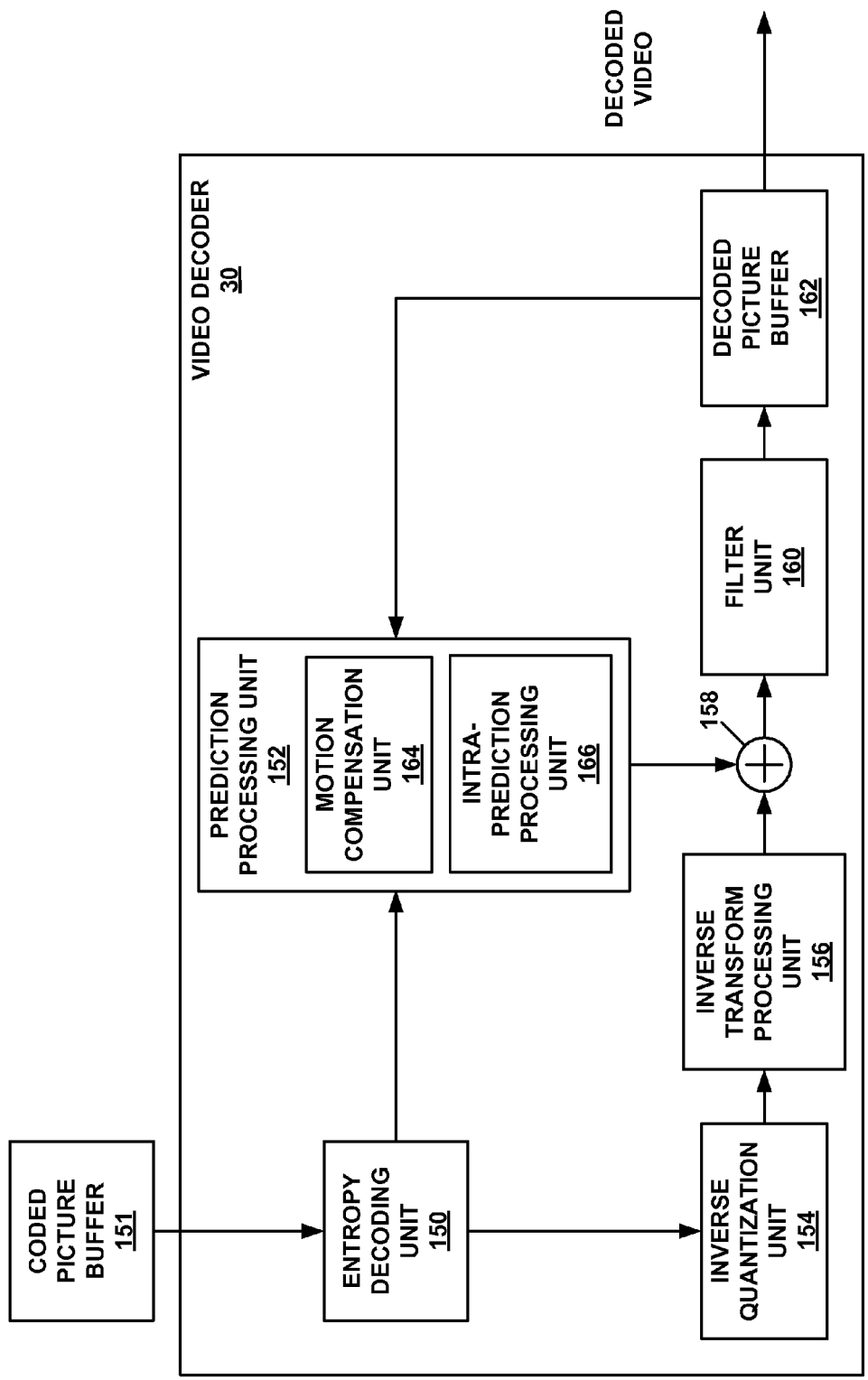
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

A coded picture buffer (CPB) 151 may receive and store encoded video data (e.g., NAL units) of a bitstream. Thus, CPB 151 may be a memory that stores video data. As described below, video decoder 30 of FIG. 3 may decode the bitstream. The bitstream may comprise a plurality of layers. In accordance with some techniques of this disclosure, at least one access unit of the encoded video bitstream includes one or more IDR pictures and one or more non-IDR pictures. For instance, video decoder 30 may decode an IDR picture of an access unit and a non-IDR picture of the same access unit.

Entropy decoding unit 150 may receive NAL units from CPB 151 and parse the NAL units to decode (i.e., obtain)

syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements obtained from the bitstream.

The NAL units of the bitstream may include coded slice NAL units that correspond to slices of pictures. As part of decoding the bitstream, entropy decoding unit 150 may extract and entropy decode syntax elements from the coded slice NAL units. Each of the coded slices may include a slice header and slice data. The slice header may contain syntax elements pertaining to a slice of a picture. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements obtained from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the transform blocks (e.g., luma, Cb and Cr transform blocks) associated with TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the coding blocks (e.g., luma, Cb and Cr coding blocks) of the CU. Video decoder 30 may store the coding blocks (e.g., the luma, Cb and Cr coding blocks) of the CU in decoded picture buffer 162. Thus, decoded picture buffer 162 may comprise a memory storing video data. Decoded picture buffer 162 may provide reference pictures for subsequent motion compensation, intra prediction, and presentation on a display device, such as display device 32 of FIG. 1. For instance, video decoder 30 may perform, based on the luma, Cb and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

Figure 4:
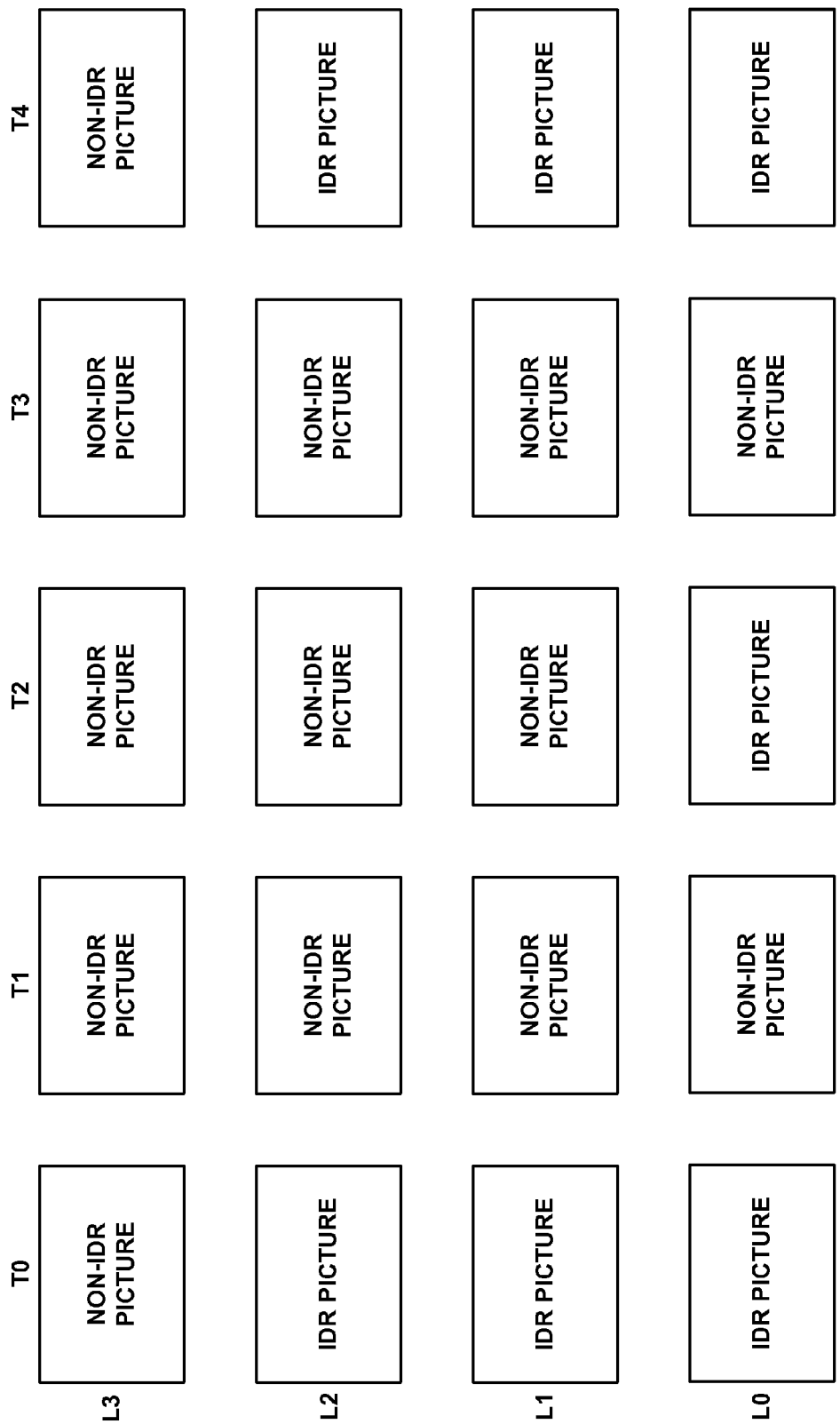
FIG. 4 is a conceptual diagram illustrating an example set of layers in which one or more access units include at least one Instantaneous Decoding Refresh (IDR) picture and at least one non-IDR picture, in accordance with one or more techniques of this disclosure.

FIG. 4 is a conceptual diagram illustrating an example set of layers in which one or more access units include at least one IDR picture and at least one non-IDR picture, in accordance with one or more techniques of this disclosure. In the example of FIG. 4, boxes correspond to IDR pictures and non-IDR pictures. Rows correspond to layers (i.e., L0-L3) and columns correspond to access units (i.e., T0-T4).

In the example of FIG. 4, IDR pictures are not required to be cross-layer aligned. For instance, access unit T0, T2, and T4 include both IDR pictures and non-IDR pictures. Furthermore, in the example of FIG. 4, IDR pictures are included at higher frequencies in lower layers than at higher layers. For instance, there are more IDR pictures in layer L0 than in layers L1, L2, or L3. As indicated above, including IDR pictures at higher frequencies at lower layers may enable tuning-in to a broadcast or a multicast session with low delay and high efficiency.

Figure 5:
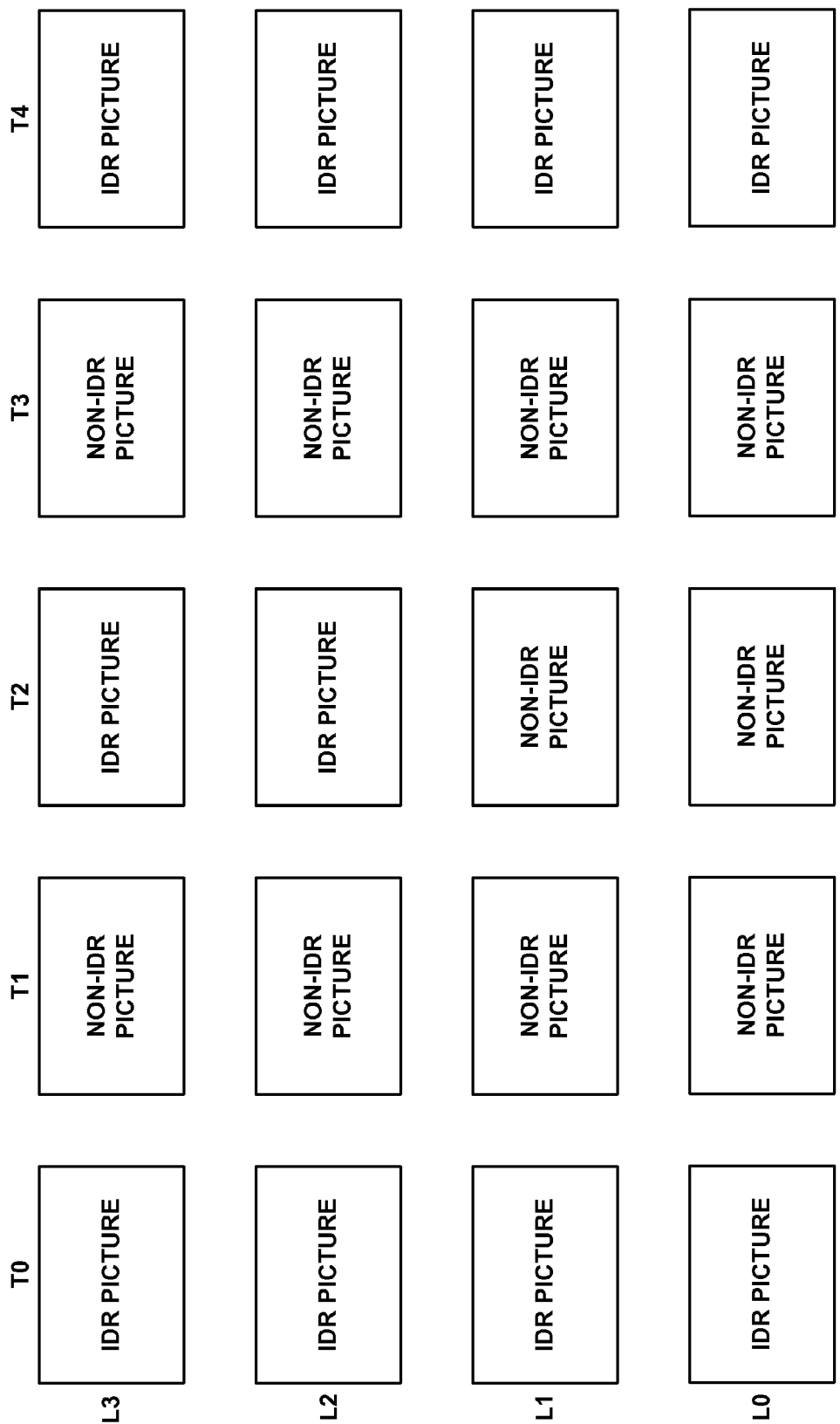
FIG. 5 is a conceptual diagram illustrating another example set of layers in which one or more access units include at least one IDR picture and at least one non-IDR picture, in accordance with one or more techniques of this disclosure.

FIG. 5 is a conceptual diagram illustrating another example set of layers in which one or more access units include at least one IDR picture and at least one non-IDR picture, in accordance with one or more techniques of this disclosure. In the example of FIG. 5, boxes correspond to IDR pictures and non-IDR pictures. Rows correspond to layers (i.e., L0-L3) and columns correspond to access units (i.e., T0-T4).

In the example of FIG. 5, IDR pictures are not required to be cross-layer aligned. For instance, access units T0, T2, and T4 include both IDR pictures and non-IDR pictures. In the example of FIG. 5, IDR pictures are included at higher frequencies in higher layers than at lower layers. For instance, there are more IDR pictures in layer L3 than in layer L0. As indicated above, including IDR pictures at higher frequencies at higher layers than at lower layers may enable faster layer up switching with high efficiency.

FIG. 6A is a flowchart illustrating an example operation of a video encoder, in accordance with one or more techniques of this disclosure. In the example of FIG. 6A, video encoder 20 generates an encoded video bitstream comprising a plurality of layers, wherein at least one access unit of the encoded video bitstream includes one or more IDR pictures and one or more non-IDR pictures (250). Furthermore, video encoder 20 outputs the encoded video bitstream (252).

Furthermore, as shown in the example of FIG. 6A, video encoder 20 may, as part of encoding the encoded video bitstream, encode pictures of video data (254). In accordance with one or more techniques of this disclosure, video encoder 20 may, as part of encoding the pictures, encode one or more IDR pictures of an access unit (256). In addition, video encoder 20 may encode one or more non-IDR pictures of the same access unit (258). Thus, in the example of FIG. 6A, IDR pictures in the encoded video bitstream are allowed to be cross-layer non-aligned. Although video encoder 20 encodes the one or more IDR pictures prior to encoding the one or more non-IDR pictures in the example of FIG. 6A, this is not necessarily the case in other examples.

FIG. 6B is a flowchart illustrating an example operation of a video decoder, in accordance with one or more techniques of this disclosure. In the example of FIG. 6B, video decoder 30 may decode an encoded video bitstream comprising a plurality of layers, wherein at least one access unit of the encoded video bitstream includes one or more IDR pictures and one or more non-IDR pictures (300).

Furthermore, as shown in the example of FIG. 6B, decoding the encoded video bitstream comprises reconstructing pictures of the video data based at least in part on syntax elements decoded/obtained from the bitstream (302). In accordance with one or more techniques of this disclosure, video decoder 30 may, as part of reconstructing pictures of the video data, decode one or more IDR pictures of an access unit (304). In addition, video decoder 30 may decode one or more non-IDR pictures of the same access unit (306). Thus, in the example of FIG. 6B, IDR pictures in the encoded video bitstream are allowed to be cross-layer non-aligned. Although video decoder 30 decodes the one or more IDR pictures prior to encoding the one or more non-IDR pictures in the example of FIG. 6B, this is not necessarily the case in other examples.

The following paragraphs provide additional examples in accordance with one or more techniques of this disclosure.

Example 1

A method of decoding video data, the method comprising decoding an encoded video bitstream comprising a plurality of layers, wherein at least one access unit of the encoded video bitstream includes one or more Instantaneous Decoding Refresh (IDR) pictures and one or more non-IDR pictures.

Example 2

The method of example 1, wherein the encoded video bitstream conforms to a requirement that, for each respective access unit of the encoded video bitstream, if one picture of the respective access unit is a Broken Link Access (BLA) pictures, all pictures of the respective access unit are BLA pictures.

Example 3

The method of examples 1 or 2, wherein generating the encoded video bitstream comprises generating the encoded video bitstream such that at least one access unit of the encoded video bitstream includes one or more Clean Random Access (CRA) pictures and one or more non-CRA pictures.

Example 4

A method of decoding video data, the method comprising decoding an encoded video bitstream that conforms to a requirement that, for each respective access unit (AU) of the encoded video bitstream, all Intra Random Access Point (IRAP) pictures of the respective AU have the same Network Abstraction Layer (NAL) unit type.

Example 5

The method of example 4, wherein the encoded video bitstream conforms to a requirement that, for each respective AU of the encoded video bitstream, when a particular picture in the respective AU has nal_unit_type equal to a value in a range from BLA_W_LP . . . RSV_IRAP_VCL23, any other picture in the respective access unit does not have nal_unit_type that is in the range from BLA_W_LP . . . RSV_IRAP_VCL23 and not equal to the nal_unit_type of the particular picture.

Example 6

A method of decoding video data, the method comprising decoding a bitstream that conforms to a first requirement and a second requirement, wherein the first requirement provides that, for each respective access unit (AU) of the bitstream, when a first picture and a second picture of the respective AU are both Intra Random Access Point (IRAP) pictures, where the first picture is of a first layer of the bitstream and the second picture is of a second layer of the bitstream and the first layer and the second layer are any two layers of the bitstream, and there exists a third picture in the first layer that is a Random Access Skipped Leading (RASL) picture of the first picture and there exists a fourth picture that is in the second layer and in the same AU as the third picture, the fourth picture is a RASL picture of the second picture, and wherein the second requirement provides that when a fifth picture in the first layer is a Random Access Decodable Leading (RADL) picture of the first picture and there exists a sixth picture that is in the second layer and the sixth picture is in the same AU as the fifth picture, the sixth picture is a RADL picture of the second picture.

Example 7

A method of decoding device data, the method comprising decoding a bitstream such that, for each respective access unit of the bitstream, a first requirement and a second requirement are satisfied, wherein the first requirement provides that when any picture in the respective access unit (AU) is a temporal sub-layer access (TSA) picture, each other picture in the respective AU is a TSA picture, and wherein the second requirement provides that when any picture in the respective AU is a step-wise temporal sub-layer access (STSA) picture, each other picture in the respective AU is a STSA picture.

Example 8

The method of example 7, wherein the first requirement provides that when any picture in the respective AU has a nal_unit_type equal to TSA_N or TSA_R, each other picture in the respective AU has a nal_unit_type equal to TSA_N or TSA_R, and wherein the second requirement provides that when any picture of the respective AU has nal_unit_type equal to STSA_N or STSA_R, each other picture in the respective AU has a nal_unit_type equal to STSA_N or STSA_R.

Example 9

A method of decoding video data comprising decoding a bitstream such that, for each respective access unit (AU) of the bitstream, a requirement is satisfied, wherein the requirement provides that, for each respective picture of the respective AU, if a network abstraction layer (NAL) unit type of the respective picture is a temporal sub-layer access (TSA) picture or a step-wise temporal sub-layer access (STSA) picture, each other picture of the respective AU has the same NAL unit type as the respective picture.

Example 10

The method of example 9, wherein the requirement provides that, for each respective picture of the respective AU, when the respective picture has nal_unit_type equal to TSA_N, TSA_R, STSA_N, or STSA_R, any other picture in the respective access unit shall have nal_unit_type equal to the nal_unit_type of the respective picture.

Example 11

A method of decoding video data, the method comprising decoding an encoded video bitstream that includes one or more coded video sequences (CVS's), wherein each CVS of the encoded video bitstream is a sequence of access units that consists, in decoding order, of an Intra Random Access Point (IRAP) access unit with a Random Access Skipped Leading (RASL) output syntax element indicating a particular value, followed by zero or more access units that are not IRAP access units with RASL output syntax element indicating the particular value, including all subsequent access units up to but not including any subsequent access unit that is an IRAP access unit with a RASL output syntax element indicating the particular value, wherein it is required that the first access unit in the encoded video bitstream is a start of a CVS, wherein an IRAP access unit is an access unit in which all coded pictures are IRAP pictures, and wherein a first access unit in a CVS is required to be an IRAP access unit.

Example 12

A device comprising a video decoder configured to perform the methods of any of examples 1-11 or combination thereof.

Example 13

A device comprising means for performing the methods of any of examples 1-11 or combination thereof.

Example 14

A computer-readable storage medium having instructions stored thereon that, when executed, configure a video decoder to perform the methods of any of examples 1-11 or combination thereof.

Example 15

A method of encoding video data, the method comprising: generating an encoded video bitstream comprising a plurality of layers, wherein at least one access unit of the encoded video bitstream includes one or more Instantaneous Decoding Refresh (IDR) pictures and one or more non-IDR pictures; and outputting the encoded video bitstream.

Example 16

The method of example 15, wherein generating the encoded video bitstream comprises generating the encoded video bitstream such that the encoded video bitstream conforms to a requirement that, for each respective access unit of the encoded video bitstream, if one picture of the respective access unit is a Broken Link Access (BLA) pictures, all pictures of the respective access unit are BLA pictures.

Example 17

The method of examples 15 or 16, wherein generating the encoded video bitstream comprises generating the encoded video bitstream such that at least one access unit of the encoded video bitstream includes one or more Clean Random Access (CRA) pictures and one or more non-CRA pictures.

Example 18

A method of encoding video data, the method comprising: generating an encoded video bitstream such that the encoded video bitstream conforms to a requirement that, for each respective access unit (AU) of the encoded video bitstream, all Intra Random Access Point (IRAP) pictures of the respective AU have the same Network Abstraction Layer (NAL) unit type; and outputting the encoded video bitstream.

Example 19

The method of example 18, wherein generating the encoded video bitstream comprises generating the encoded video bitstream such that the encoded video bitstream conforms to a requirement that, for each respective AU of the encoded video bitstream, when a particular picture in the respective AU has nal_unit_type equal to a value in a range from BLA_W_LP . . . RSV_IRAP_VCL23, any other picture in the respective access unit does not have nal_unit_type that is in the range from BLA_W_LP . . . RSV_IRAP_VCL23 and not equal to the nal_unit_type of the particular picture.

Example 20

A method of encoding video data, the method comprising: generating a bitstream such that the bitstream conforms to a first requirement and a second requirement, wherein the first requirement provides that, for each respective access unit (AU) of the bitstream, when a first picture and a second picture of the respective AU are both Intra Random Access Point (IRAP) pictures, where the first picture is of a first layer of the bitstream and the second picture is of a second layer of the bitstream and the first layer and the second layer are any two layers of the bitstream, and there exists a third picture in the first layer that is a Random Access Skipped Leading (RASL) picture of the first picture and there exists a fourth picture that is in the second layer and in the same AU as the third picture, the fourth picture is a RASL picture of the second picture, and wherein the second requirement provides that when a fifth picture in the first layer is a Random Access Decodable Leading (RADL) picture of the first picture and there exists a sixth picture that is in the second layer and the sixth picture is in the same AU as the fifth picture, the sixth picture is a RADL picture of the second picture; and outputting the bitstream.

Example 21

A method of encoding video data, the method comprising: generating a bitstream such that, for each respective access unit of the bitstream, a first requirement and a second requirement are satisfied, wherein the first requirement provides that when any picture in the respective access unit (AU) is a temporal sub-layer access (TSA) picture, each other picture in the respective AU is a TSA picture, and wherein the second requirement provides that when any picture in the respective AU is a step-wise temporal sub-layer access (STSA) picture, each other picture in the respective AU is a STSA picture; and outputting the bitstream.

Example 22

The method of example 21, wherein the first requirement provides that when any picture in the respective AU has a nal_unit_type equal to TSA_N or TSA_R, each other picture in the respective AU has a nal_unit_type equal to TSA_N or TSA_R, and wherein the second requirement provides that when any picture of the respective AU has nal_unit_type equal to STSA_N or STSA_R, each other picture in the respective AU has a nal_unit_type equal to STSA_N or STSA_R.

Example 23

A method of encoding video data, the method comprising: generating a bitstream such that, for each respective access unit (AU) of the bitstream, a requirement is satisfied, wherein the requirement provides that, for each respective picture of the respective AU, if a network abstraction layer (NAL) unit type of the respective picture is a temporal sub-layer access (TSA) picture or a step-wise temporal sub-layer access (STSA) picture, each other picture of the respective AU has the same NAL unit type as the respective picture; and outputting the bitstream.

Example 24

The method of example 23, wherein the requirement provides that, for each respective picture of the respective AU, when the respective picture has nal_unit_type equal to TSA_N, TSA_R, STSA_N, or STSA_R, any other picture in the respective access unit shall have nal_unit_type equal to the nal_unit_type of the respective picture.

Example 25

A method of encoding video data, the method comprising: generating an encoded video bitstream that includes one or more coded video sequences (CVS's), wherein each CVS of the encoded video bitstream is a sequence of access units that consists, in decoding order, of an Intra Random Access Point (IRAP) access unit with a Random Access Skipped Leading (RASL) output syntax element indicating a particular value, followed by zero or more access units that are not IRAP access units with RASL output syntax element indicating the particular value, including all subsequent access units up to but not including any subsequent access unit that is an IRAP access unit with a RASL output syntax element indicating the particular value, wherein it is required that the first access unit in the encoded video bitstream is a start of a CVS, wherein an IRAP access unit is an access unit in which all coded pictures are IRAP pictures, and wherein a first access unit in a CVS is required to be an IRAP access unit, and outputting the encoded video bitstream.

Example 26

A device comprising a video encoder configured to perform the methods of any of examples 19-29 or combination thereof.

Example 27

A device comprising means for performing the methods of any of examples 19-29 or combination thereof.

Example 28

A computer-readable storage medium having instructions stored thereon that, when executed, configure a video encoder to perform the methods of any of examples 19-29 or combination thereof.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising decoding an encoded video bitstream comprising a plurality of layers, wherein at least one access unit of the encoded video bitstream includes one or more Instantaneous Decoding Refresh (IDR) pictures and one or more non-IDR pictures,
   wherein decoding the encoded video bitstream comprises reconstructing pictures of the video data based at least in part on syntax elements decoded from the encoded video bitstream,
   wherein each picture of the at least one access unit of the encoded video bitstream corresponds to a same time instance,
   wherein the encoded video bitstream conforms to a first requirement that, for each respective access unit of the encoded video bitstream, all Intra Random Access Point (IRAP) pictures of the respective access unit have the same Network Abstraction Layer (NAL) unit type, and
   wherein the encoded video bitstream conforms to a second requirement that, for each respective access unit of the encoded video bitstream, when a particular picture in the respective access unit has nal_unit_type equal to a value in a range from BLA_W_LP to RSV_I-RAP_VCL23, any other picture in the respective access unit does not have nal_unit_type that is in the range from BLA_W_LP to RSV_IRAP_VCL23 and not equal to the nal_unit_type of the particular picture.

2. The method of claim 1, wherein the encoded video bitstream includes more frequent random access points at lower ones of the layers than at higher ones of the layers.

3. The method of claim 1, wherein the encoded video bitstream includes more frequent random access points at higher ones of the layers than at lower ones of the layers.

4. The method of claim 1, wherein the encoded video bitstream conforms to a requirement that, for each respective access unit of the encoded video bitstream, when one picture of the respective access unit is a Broken Link Access (BLA) picture, all pictures of the respective access unit are BLA pictures.

5. The method of claim 1, wherein the encoded video bitstream further conforms to a third requirement and a fourth requirement,
   wherein the third requirement provides that, for each respective access unit of the encoded video bitstream, when a first picture and a second picture of the respective access unit are both Intra Random Access Point (IRAP) pictures, where the first picture is of a first layer of the encoded video bitstream and the second picture is of a second layer of the encoded video bitstream and the first layer and the second layer are any two layers of the encoded video bitstream, and there exists a third picture in the first layer that is a Random Access Skipped Leading (RASL) picture of the first picture and there exists a fourth picture that is in the second layer and in the same access unit as the third picture, the fourth picture is a RASL picture of the second picture, and
   wherein the fourth requirement provides that when a fifth picture in the first layer is a Random Access Decodable Leading (RADL) picture of the first picture and there exists a sixth picture that is in the second layer and the sixth picture is in the same access unit as the fifth picture, the sixth picture is a RADL picture of the second picture.

6. The method of claim 1, wherein for each respective access unit of the encoded video bitstream, a third requirement and a fourth requirement are satisfied,
   wherein the third requirement provides that when any picture in the respective access unit is a temporal sub-layer access (TSA) picture, each other picture in the respective access unit is a TSA picture, and
   wherein the fourth requirement provides that when any picture in the respective access unit is a step-wise temporal sub-layer access (STSA) picture, each other picture in the respective access unit is a STSA picture.

7. The method of claim 1, wherein, for each respective access unit of the encoded video bitstream, a third requirement is satisfied, wherein the third requirement provides that, for each respective picture of the respective access unit, when a network abstraction layer (NAL) unit type of the respective picture is a temporal sub-layer access (TSA) picture or a step-wise temporal sub-layer access (STSA) picture, each other picture of the respective access unit has the same NAL unit type as the respective picture.

8. The method of claim 1,
   wherein the encoded video bitstream includes one or more coded video sequences (CVSs),
   wherein each CVS of the encoded video bitstream is a sequence of access units that consists, in decoding order, of an Intra Random Access Point (IRAP) access unit with a Random Access Skipped Leading (RASL) output variable indicating a particular value, followed by zero or more access units that are not IRAP access units with RASL output variables indicating the particular value, including all subsequent access units up to but not including any subsequent access unit that is an IRAP access unit with a RASL output variable indicating the particular value,
wherein it is required that an access unit occurring, in decoding order, first in the encoded video bitstream is a start of a CVS,
wherein an IRAP access unit is an access unit in which all coded pictures are IRAP pictures, and
wherein an access unit occurring, in decoding order, first in a CVS is required to be an IRAP access unit.

9. A method of encoding video data, the method comprising:
generating an encoded video bitstream comprising a plurality of layers, wherein at least one access unit of the encoded video bitstream includes one or more Instantaneous Decoding Refresh (IDR) pictures and one or more non-IDR pictures, and wherein each picture of the at least one access unit of the encoded video bitstream corresponds to a same time instance; and
outputting the encoded video bitstream,
wherein generating the encoded video bitstream comprises generating the encoded video bitstream such that the encoded video bitstream conforms to a first requirement that, for each respective access unit of the encoded video bitstream, all Intra Random Access Point (IRAP) pictures of the respective access unit have the same Network Abstraction Layer (NAL) unit type, and
wherein generating the encoded video bitstream comprises generating the encoded video bitstream such that the encoded video bitstream conforms to a second requirement that, for each respective access unit of the encoded video bitstream, when a particular picture in the respective access unit has a NAL unit type equal to a value in a range from BLA_W_LP to RSV_I-RAP_VCL23, any other picture in the respective access unit does not have a NAL unit type that is in the range from BLA_W_LP to RSV_IRAP_VCL23 and not equal to the nal_unit_type of the particular picture.

10. The method of claim 9, wherein the encoded video bitstream includes more frequent random access points at lower ones of the layers than at higher ones of the layers.

11. The method of claim 9, wherein the encoded video bitstream includes more frequent random access points at higher ones of the layers than at lower ones of the layers.

12. The method of claim 9, wherein generating the encoded video bitstream comprises generating the encoded video bitstream such that the encoded video bitstream conforms to a third requirement that, for each respective access unit of the encoded video bitstream, when one picture of the respective access unit is a Broken Link Access (BLA) pictures, all pictures of the respective access unit are BLA pictures.

13. The method of claim 9, wherein generating the encoded video bitstream comprises generating the encoded video bitstream such that the encoded video bitstream conforms to a third requirement and a fourth requirement,
wherein the third requirement provides that, for each respective access unit of the encoded video bitstream, when a first picture and a second picture of the respective access unit are both Intra Random Access Point (IRAP) pictures, where the first picture is of a first layer of the encoded video bitstream and the second picture is of a second layer of the encoded video bitstream and the first layer and the second layer are any two layers of the encoded video bitstream, and there exists a third picture in the first layer that is a Random Access Skipped Leading (RASL) picture of the first picture and there exists a fourth picture that is in the second layer and in the same access unit as the third picture, the fourth picture is a RASL picture of the second picture, and
wherein the fourth requirement provides that when a fifth picture in the first layer is a Random Access Decodable Leading (RADL) picture of the first picture and there exists a sixth picture that is in the second layer and the sixth picture is in the same access unit as the fifth picture, the sixth picture is a RADL picture of the second picture.

14. The method of claim 9, wherein generating the encoded video bitstream comprises generating the encoded video bitstream such that, for each respective access unit of the encoded video bitstream, a third requirement and a fourth requirement are satisfied,
wherein the third requirement provides that when any picture in the respective access unit is a temporal sub-layer access (TSA) picture, each other picture in the respective access unit is a TSA picture, and
wherein the fourth requirement provides that when any picture in the respective access unit is a step-wise temporal sub-layer access (STSA) picture, each other picture in the respective access unit is a STSA picture.

15. The method of claim 9, wherein generating the encoded video bitstream comprises generating the encoded video bitstream such that, for each respective access unit of the encoded video bitstream, a third requirement is satisfied, wherein the third requirement provides that, for each respective picture of the respective access unit, when a network abstraction layer (NAL) unit type of the respective picture is a temporal sub-layer access (TSA) picture or a step-wise temporal sub-layer access (STSA) picture, each other picture of the respective access unit has the same NAL unit type as the respective picture.

16. The method of claim 9, wherein generating the encoded video bitstream comprises generating the encoded video bitstream such that the encoded video bitstream includes one or more coded video sequences (CVSs),
wherein each CVS of the encoded video bitstream is a sequence of access units that consists, in decoding order, of an Intra Random Access Point (IRAP) access unit with a Random Access Skipped Leading (RASL) output variable indicating a particular value, followed by zero or more access units that are not IRAP access units with a RASL output variable indicating the particular value, including all subsequent access units up to but not including any subsequent access unit that is an IRAP access unit with a RASL output variable indicating the particular value,
wherein it is required that an access unit occurring, in decoding order, first in the encoded video bitstream is a start of a CVS,
wherein an IRAP access unit is an access unit in which all coded pictures are IRAP pictures, and
wherein an access unit occurring, in decoding order, first in a CVS is required to be an IRAP access unit.

17. A device for decoding video data, the device comprising:
a memory configured to store the video data; and
one or more processors in communication with the memory and configured to decode an encoded video bitstream that comprises a plurality of layers, wherein at least one access unit of the encoded video bitstream includes one or more Instantaneous Decoding Refresh (IDR) pictures and one or more non-IDR pictures, wherein the one or more processors are configured such that, as part of decoding the encoded video bitstream, the one or more processors reconstruct pictures of the video data based at least in part on syntax elements decoded from the encoded video bitstream, wherein each picture of the at least one access unit of the encoded video bitstream corresponds to a same time instance, wherein the encoded video bitstream conforms to a first requirement that, for each respective access unit of the encoded video bitstream, all Intra Random Access Point (IRAP) pictures of the respective access unit have the same Network Abstraction Layer (NAL) unit type, and wherein the encoded video bitstream conforms to a second requirement that, for each respective access unit of the encoded video bitstream, when a particular picture in the respective access unit has a NAL unit type equal to a value in a range from BLA_W_LP to RSV_I-RAP_VCL23, any other picture in the respective access unit does not have a NAL unit type that is in the range from BLA_W_LP to RSV_IRAP_VCL23 and not equal to the NAL unit type of the particular picture.

18. The device of claim 17, wherein the encoded video bitstream includes more frequent random access points at lower ones of the layers than at higher ones of the layers.

19. The device of claim 17, wherein the encoded video bitstream includes more frequent random access points at higher ones of the layers than at lower ones of the layers.

20. The device of claim 17, wherein the encoded video bitstream conforms to a third requirement that, for each respective access unit of the encoded video bitstream, when one picture of the respective access unit is a Broken Link Access (BLA) picture, all pictures of the respective access unit are BLA pictures.

21. The device of claim 17, wherein the encoded video bitstream further conforms to a third requirement and a fourth requirement, wherein the third requirement provides that, for each respective access unit of the encoded video bitstream, when a first picture and a second picture of the respective access unit are both Intra Random Access Point (IRAP) pictures, where the first picture is of a first layer of the encoded video bitstream and the second picture is of a second layer of the encoded video bitstream and the first layer and the second layer are any two layers of the encoded video bitstream, and there exists a third picture in the first layer that is a Random Access Skipped Leading (RASL) picture of the first picture and there exists a fourth picture that is in the second layer and in the same access unit as the third picture, the fourth picture is a RASL picture of the second picture, and wherein the fourth requirement provides that when a fifth picture in the first layer is a Random Access Decodable Leading (RADL) picture of the first picture and there exists a sixth picture that is in the second layer and the sixth picture is in the same access unit as the fifth picture, the sixth picture is a RADL picture of the second picture.

22. The device of claim 17, wherein for each respective access unit of the encoded video bitstream, a third requirement and a fourth requirement are satisfied, wherein the third requirement provides that when any picture in the respective access unit is a temporal sub-layer access (TSA) picture, each other picture in the respective access unit is a TSA picture, and wherein the fourth requirement provides that when any picture in the respective access unit is a step-wise temporal sub-layer access (STSA) picture, each other picture in the respective access unit is a STSA picture.

23. The device of claim 17, wherein, for each respective access unit of the encoded video bitstream, a third requirement is satisfied, wherein the third requirement provides that, for each respective picture of the respective access unit, when a network abstraction layer (NAL) unit type of the respective picture is a temporal sub-layer access (TSA) picture or a step-wise temporal sub-layer access (STSA) picture, each other picture of the respective access unit has the same NAL unit type as the respective picture.

24. The device of claim 17, wherein the encoded video bitstream includes one or more coded video sequences (CVSs), wherein each CVS of the encoded video bitstream is a sequence of access units that consists, in decoding order, of an Intra Random Access Point (IRAP) access unit with a Random Access Skipped Leading (RASL) output variable indicating a particular value, followed by zero or more access units that are not IRAP access units with RASL output variables indicating the particular value, including all subsequent access units up to but not including any subsequent access unit that is an IRAP access unit with a RASL output variable indicating the particular value, wherein it is required that an access unit occurring, in decoding order, first in the encoded video bitstream is a start of a CVS, wherein an IRAP access unit is an access unit in which all coded pictures are IRAP pictures, and wherein an access unit occurring, in decoding order, first in a CVS is required to be an IRAP access unit.

25. A device for encoding video data, the device comprising:

a memory configured to store the video data; and one or more processors in communication with the memory and configured to:

generate an encoded video bitstream comprising a plurality of layers, wherein at least one access unit of the encoded video bitstream includes one or more Instantaneous Decoding Refresh (IDR) pictures and one or more non-IDR pictures, and wherein each picture of the at least one access unit of the encoded video bitstream corresponds to a same time instance; and output the encoded video bitstream, wherein the encoded video bitstream conforms to a first requirement that, for each respective access unit of the encoded video bitstream, all Intra Random Access Point (IRAP) pictures of the respective access unit have the same Network Abstraction Layer (NAL) unit type, and wherein the encoded video bitstream conforms to a second requirement that, for each respective access unit of the encoded video bitstream, when a particular picture in the respective access unit has a NAL unit type equal to a value in a range from BLA_W_LP to RSV_IRAP_VCL23, any other picture in the respective access unit does not have a NAL unit type that is in the range from BLA_W_LP to RSV_IRAP_VCL23 and not equal to the NAL unit type of the particular picture.

26. The device of claim 25, wherein the encoded video bitstream includes more frequent random access points at lower ones of the layers than at higher ones of the layers.

27. The device of claim 25, wherein the encoded video bitstream includes more frequent random access points at higher ones of the layers than at lower ones of the layers.

28. The device of claim 25, wherein the one or more processors are configured to generate the encoded video bitstream such that the encoded video bitstream conforms to a third requirement that, for each respective access unit of the encoded video bitstream, when one picture of the respective access unit is a Broken Link Access (BLA) pictures all pictures of the respective access unit are BLA pictures.

29. The device of claim 25, wherein the one or more processors are configured to generate the encoded video bitstream such that the encoded video bitstream conforms to a third requirement and a fourth requirement,
 wherein the third requirement provides that, for each respective access unit of the encoded video bitstream, when a first picture and a second picture of the respective access unit are both Intra Random Access Point (IRAP) pictures, where the first picture is of a first layer of the encoded video bitstream and the second picture is of a second layer of the encoded video bitstream and the first layer and the second layer are any two layers of the encoded video bitstream, and there exists a third picture in the first layer that is a Random Access Skipped Leading (RASL) picture of the first picture and there exists a fourth picture that is in the second layer and in the same access unit as the third picture, the fourth picture is a RASL picture of the second picture, and
 wherein the fourth requirement provides that when a fifth picture in the first layer is a Random Access Decodable Leading (RADL) picture of the first picture and there exists a sixth picture that is in the second layer and the sixth picture is in the same access unit as the fifth picture, the sixth picture is a RADL picture of the second picture.

30. The device of claim 25, wherein the one or more processors are configured to generate the encoded video bitstream such that, for each respective access unit of the encoded video bitstream, a third requirement and a fourth requirement are satisfied,
 wherein the third requirement provides that when any picture in the respective access unit is a temporal sub-layer access (TSA) picture, each other picture in the respective access unit is a TSA picture, and
 wherein the fourth requirement provides that when any picture in the respective access unit is a step-wise temporal sub-layer access (STSA) picture, each other picture in the respective access unit is a STSA picture.

31. The device of claim 25, wherein the one or more processors are configured to generate the encoded video bitstream such that, for each respective access unit of the encoded video bitstream, a third requirement is satisfied, wherein the requirement provides that, for each respective picture of the respective access unit, when a network abstraction layer (NAL) unit type of the respective picture is a temporal sub-layer access (TSA) picture or a step-wise temporal sub-layer access (STSA) picture, each other picture of the respective access unit has the same NAL unit type as the respective picture.

32. The device of claim 25, wherein the one or more processors are configured to generate the encoded video bitstream such that the encoded video bitstream includes one or more coded video sequences (CVSs),
 wherein each CVS of the encoded video bitstream is a sequence of access units that consists, in decoding order, of an Intra Random Access Point (IRAP) access unit with a Random Access Skipped Leading (RASL) output variable indicating a particular value, followed by zero or more access units that are not IRAP access units with a RASL output variable indicating the particular value, including all subsequent access units up to but not including any subsequent access unit that is an IRAP access unit with a RASL output variable indicating the particular value,
 wherein it is required that an access unit occurring, in decoding order, first in the encoded video bitstream is a start of a CVS,
 wherein an IRAP access unit is an access unit in which all coded pictures are IRAP pictures, and
 wherein an access unit occurring, in decoding order, first in a CVS is required to be an IRAP access unit.

33. A device for decoding video data, the device comprising:
 means for storing the video data; and
 means for decoding an encoded video bitstream comprising a plurality of layers, wherein at least one access unit of the encoded video bitstream includes one or more Instantaneous Decoding Refresh (IDR) pictures and one or more non-IDR pictures,
 wherein the means for decoding the encoded video bitstream comprises means for reconstructing pictures of the video data based at least in part on syntax elements decoded from the encoded video bitstream,
 wherein the at least one access unit of the encoded video bitstream comprises a set of pictures that correspond to a same time instance,
 wherein the encoded video bitstream conforms to a first requirement that, for each respective access unit of the encoded video bitstream, all Intra Random Access Point (IRAP) pictures of the respective access unit have the same Network Abstraction Layer (NAL) unit type, and
 wherein the encoded video bitstream conforms to a second requirement that, for each respective access unit of the encoded video bitstream, when a particular picture in the respective access unit has nal_unit_type equal to a value in a range from BLA_W_LP to RSV_I-RAP_VCL23, any other picture in the respective access unit does not have nal_unit_type that is in the range from BLA_W_LP to RSV_IRAP_VCL23 and not equal to the nal_unit_type of the particular picture.

34. A device for encoding video data, the device comprising:
 means for generating an encoded video bitstream comprising a plurality of layers, wherein at least one access unit of the encoded video bitstream includes one or more Instantaneous Decoding Refresh (IDR) pictures and one or more non-IDR pictures, wherein each picture of the at least one access unit of the encoded video bitstream corresponds to a same time instance; and
 means for outputting the encoded video bitstream,
 wherein the encoded video bitstream conforms to a first requirement that, for each respective access unit of the encoded video bitstream, all Intra Random Access Point (IRAP) pictures of the respective access unit have the same Network Abstraction Layer (NAL) unit type, and
 wherein the encoded video bitstream conforms to a second requirement that, for each respective access unit of the encoded video bitstream, when a particular picture in the respective access unit has a NAL unit type equal to a value in a range from BLA_W_LP to RSV_IRAP_VCL23, any other picture in the respective access unit does not have a NAL unit type that is in the range from BLA_W_LP to RSV_IRAP_VCL23 and not equal to the NAL unit type of the particular picture.

35. A non-transitory computer-readable data storage medium having instructions stored thereon that when executed cause one or more processors to:
  decode an encoded video bitstream comprising a plurality of layers, wherein at least one access unit of the encoded video bitstream includes one or more Instantaneous Decoding Refresh (IDR) pictures and one or more non-IDR pictures,
  wherein as part of decoding the encoded video bitstream, the one or more processors reconstruct pictures of the video data based at least in part on syntax elements decoded from the encoded video bitstream,
  wherein each picture of the at least one access unit of the encoded video bitstream corresponds to a same time instance,
  wherein the encoded video bitstream conforms to a first requirement that, for each respective access unit of the encoded video bitstream, all Intra Random Access Point (IRAP) pictures of the respective access unit have the same Network Abstraction Layer (NAL) unit type, and
  wherein the encoded video bitstream conforms to a second requirement that, for each respective access unit of the encoded video bitstream, when a particular picture in the respective access unit has a NAL unit type equal to a value in a range from BLA_W_LP to RSV_IRAP_VCL23, any other picture in the respective access unit does not have a NAL unit type that is in the range from BLA_W_LP to RSV_IRAP_VCL23 and not equal to the NAL unit type of the particular picture.

36. A non-transitory computer-readable data storage medium having instructions stored thereon that when executed cause one or more processors to:
  generate an encoded video bitstream comprising a plurality of layers, wherein at least one access unit of the encoded video bitstream includes one or more Instantaneous Decoding Refresh (IDR) pictures and one or more non-IDR pictures, wherein each picture of the at least one access unit of the encoded video bitstream corresponds to a same time instance; and
  output the encoded video bitstream,
  wherein the encoded video bitstream conforms to a first requirement that, for each respective access unit of the encoded video bitstream, all Intra Random Access Point (IRAP) pictures of the respective access unit have the same Network Abstraction Layer (NAL) unit type, and
  wherein the encoded video bitstream conforms to a second requirement that, for each respective access unit of the encoded video bitstream, when a particular picture in the respective access unit has a NAL unit type equal to a value in a range from BLA_W_LP to RSV_IRAP_VCL23, any other picture in the respective access unit does not have a NAL unit type that is in the range from BLA_W_LP to RSV_IRAP_VCL23 and not equal to the NAL unit type of the particular picture.

* * * * *